(12) United States Patent
Iwatsuka

(10) Patent No.: US 7,444,040 B2
(45) Date of Patent: Oct. 28, 2008

(54) MAGNETO-OPTICAL COMPONENT

(75) Inventor: Shinji Iwatsuka, Tokyo (JP)

(73) Assignee: TDK Corporation, Tokyo (JP)

( * ) Notice: Subject to any disclaimer, the term of this patent is extended or adjusted under 35 U.S.C. 154(b) by 884 days.

(21) Appl. No.: 11/038,544

(22) Filed: Jan. 21, 2005

(65) Prior Publication Data

US 2005/0179980 A1    Aug. 18, 2005

(30) Foreign Application Priority Data

Jan. 23, 2004  (JP)  ............................. 2004-015851
May 31, 2004  (JP)  ............................. 2004-161413

(51) Int. Cl.
G02F 1/295    (2006.01)
G02F 1/09     (2006.01)

(52) U.S. Cl. ............................. 385/6; 359/283; 359/281

(58) Field of Classification Search ....................... 385/6
See application file for complete search history.

(56) References Cited

U.S. PATENT DOCUMENTS 5,477,376 A * 12/1995 Iwatsuka et al. ............. 359/283
5,889,609 A *  3/1999 Fukushima .................. 359/280
6,018,411 A *  1/2000 Fukushima et al. .......... 359/283
6,018,412 A *  1/2000 Fukushima .................. 359/283
6,198,567 B1 * 3/2001 Bergmann ................... 359/281
6,333,806 B1 * 12/2001 Onaka et al. ................ 359/283
6,833,941 B2 * 12/2004 Iwatsuka .................... 359/283
2004/0027639 A1    2/2004 Iwatsuka

FOREIGN PATENT DOCUMENTS

JP           2815509 B2      8/1998
JP           2004-133387 A   4/2004

* cited by examiner

*Primary Examiner*—M. R. Connelly-Cushwa
(74) *Attorney, Agent, or Firm*—Oliff & Berridge, PLC

(57) ABSTRACT

The invention relates to a magneto-optical component, such as a variable light attenuator, light modulator or optical switch, having small size, low power consumption and high speed. The magneto-optical component comprises at least one Faraday rotator comprising a magnetic domain A with magnetization in a direction perpendicular to a light incident/exit surface, a magnetic domain B with magnetization in a direction opposite to the magnetization direction of the magnetic domain A, a planar magnetic domain wall as a boundary between the magnetic domain A and the magnetic domain B, and two light transmission regions through which a plurality of light beams comprising identical traveling directions are transmitted respectively and whose distances from the magnetic domain wall are almost equal to each other, and a magnetic field application system for applying a variable magnetic field to the Faraday rotator to make a position of the magnetic domain wall variable.

13 Claims, 16 Drawing Sheets

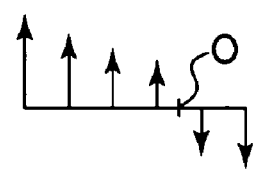
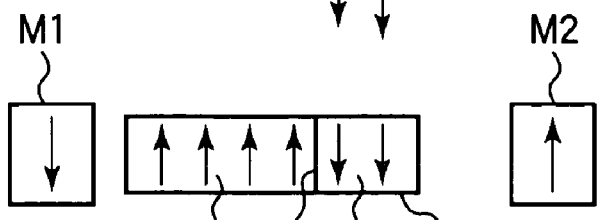
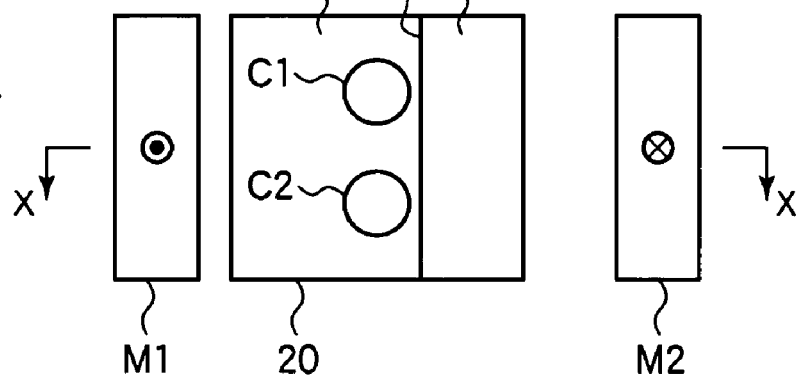
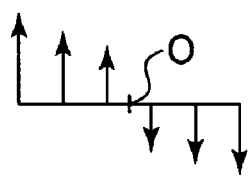
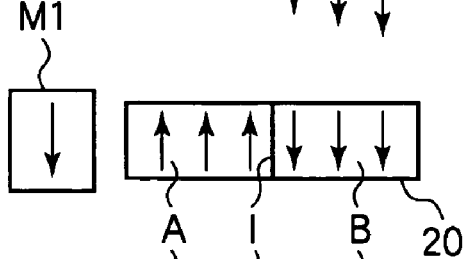
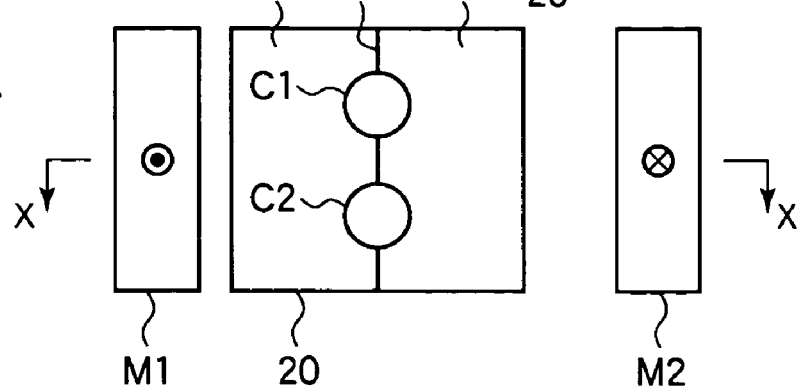

FIG.3C
FIG.3B
FIG.3A
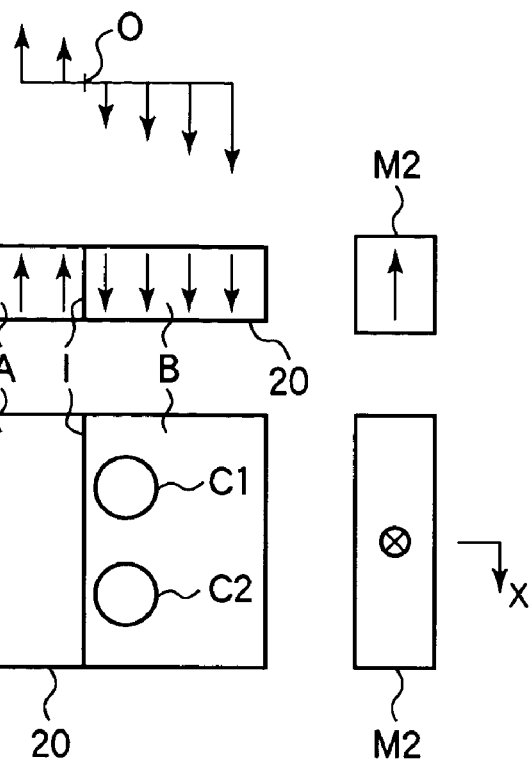
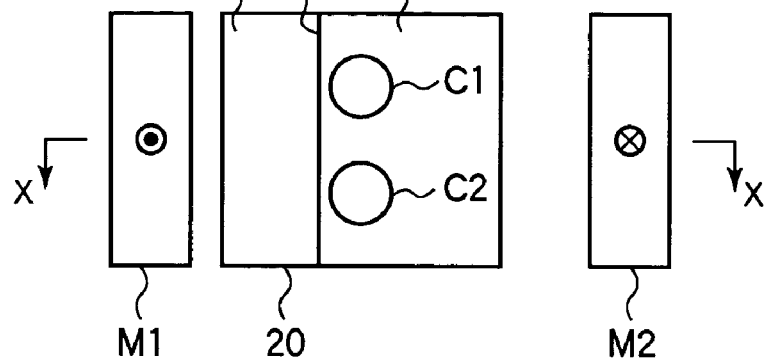
FIG.4C
FIG.4B
FIG.4A
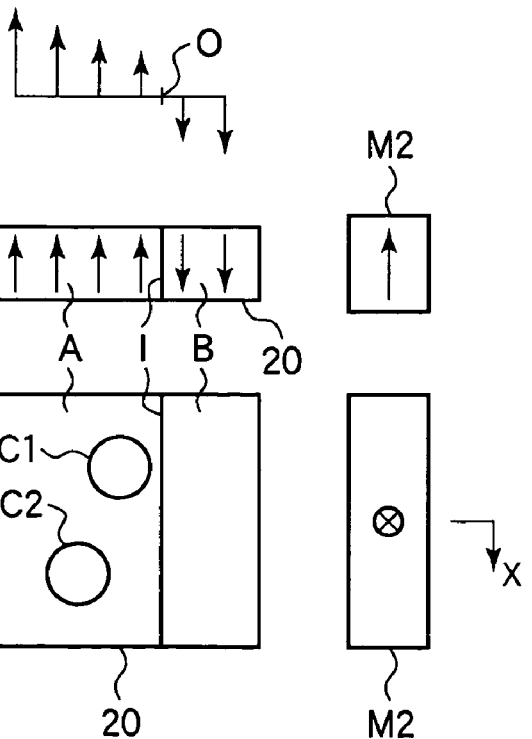
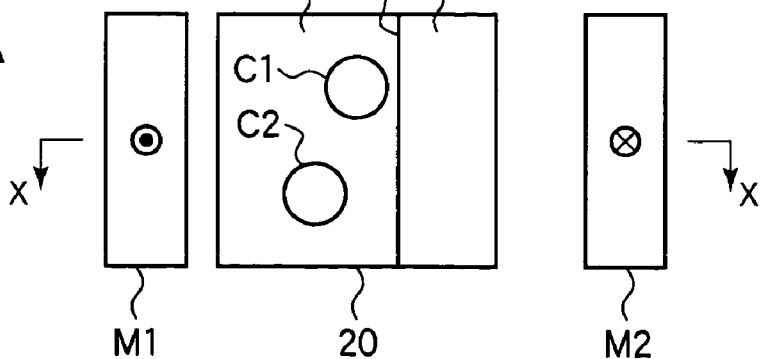

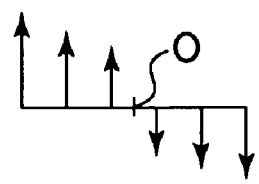
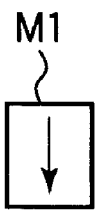
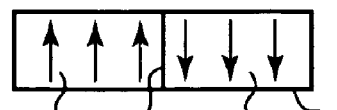
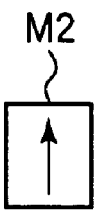
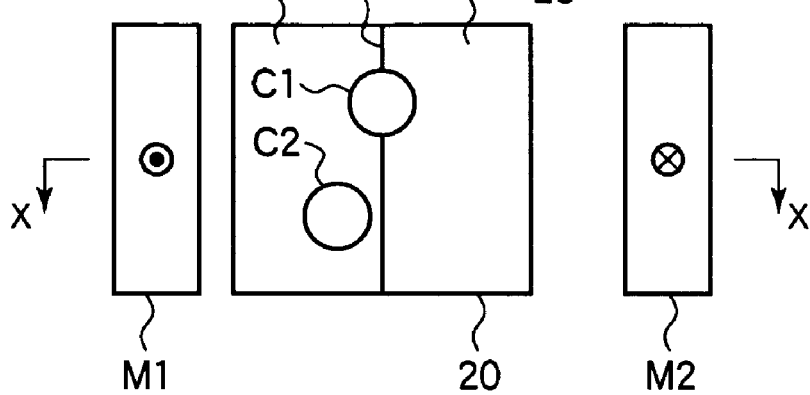
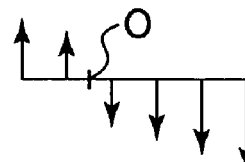
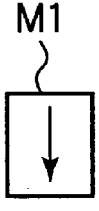
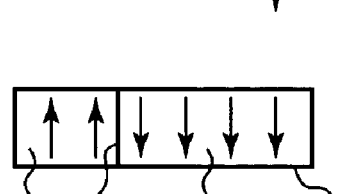
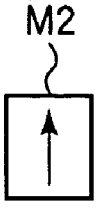
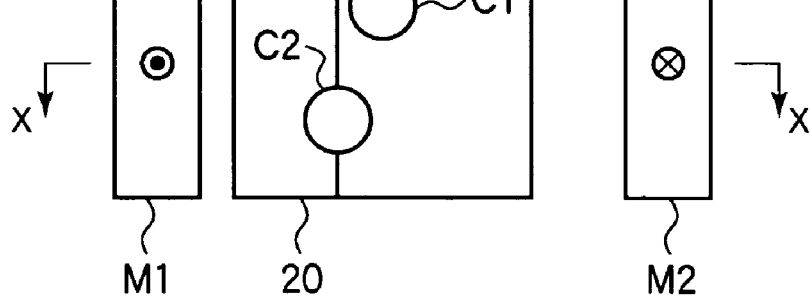

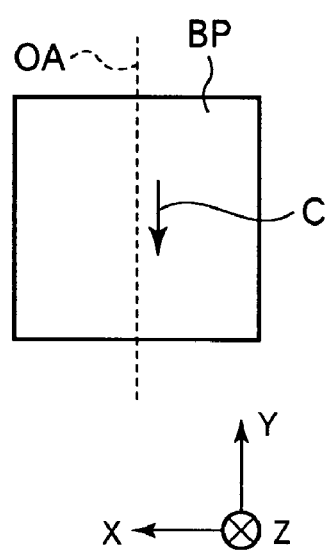
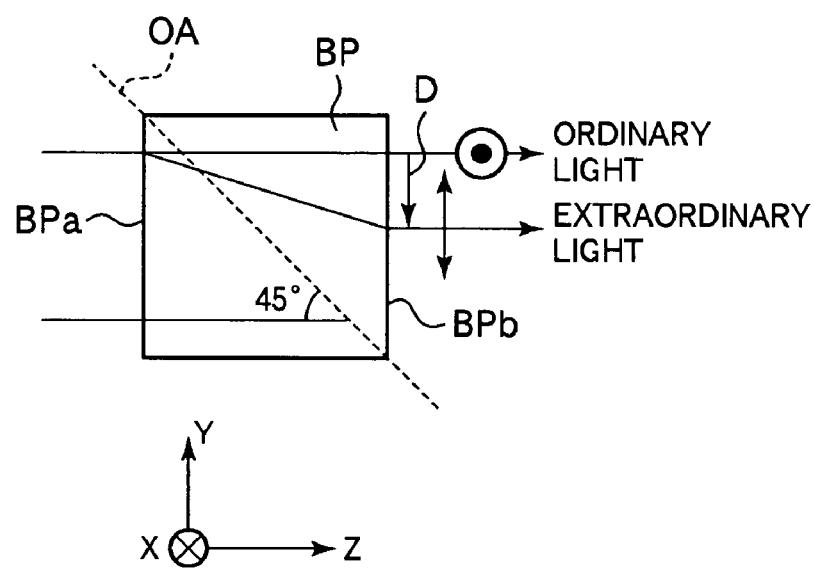

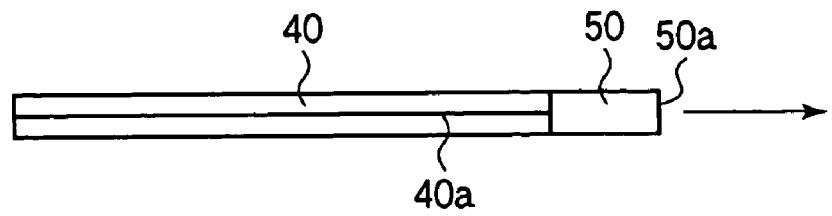
FIG.16A
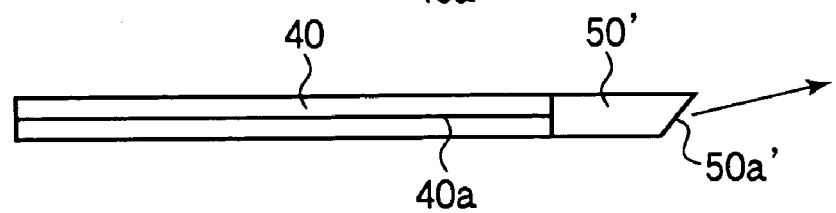
FIG.16B
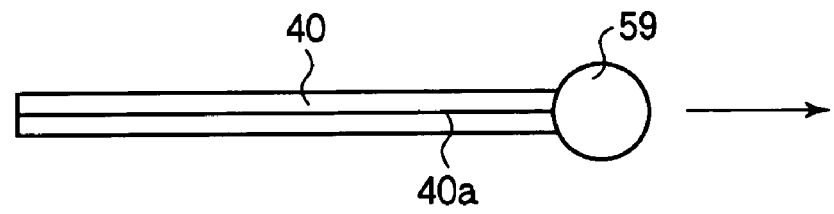
FIG.16C
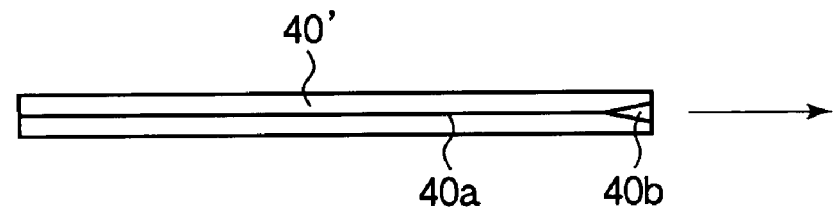
FIG.16D
FIG.17
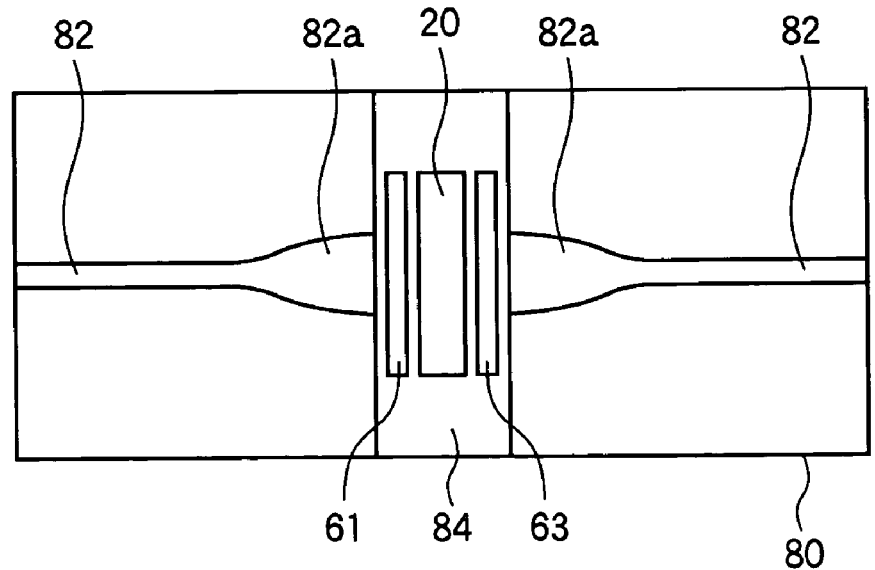

MAGNETO-OPTICAL COMPONENT

BACKGROUND OF THE INVENTION

1. Field of the Invention

The present invention relates to a magneto-optical optical component used for an optical communication system, such as a variable light attenuator, a light modulator, or an optical switch.

2. Description of the Related Art

As one of magneto-optical components used for an optical communication system, there is a variable light attenuator. As the variable light attenuator, there is known a so-call magneto-optical variable light attenuator for controlling the amount of attenuation of light by changing a Faraday rotation angle according to the intensity of an applied magnetic field. Since the magneto-optical variable light attenuator comprises no mechanical movable part, there are merits that its reliability is high and miniaturization is easy. The magneto-optical variable light attenuator comprises a magneto-optical element (magneto-optical crystal) and an electromagnet for applying a magnetic field to the magneto-optical element. The intensity of magnetization of the magneto-optical element is changed by changing the amount of current flowing through a coil of the electromagnet to control the intensity of the magnetic field applied to the magneto-optical element, and the Faraday rotation angle can be controlled.

A method of controlling the magnetic field applied to the magneto-optical element is disclosed in, for example, patent document 1 (Japanese Patent No. 2815509). The magnetic field control method will be described with reference to FIGS. 22A and 22B. FIG. 22A shows a variable light attenuator, and the variable light attenuator comprises a Faraday rotator (magneto-optical element) 113 and a polarizer 112. Besides, the variable light attenuator comprises a permanent magnet 114 and an electromagnet 115 for applying magnetic fields to the Faraday rotator 113 in directions orthogonal to each other, and a variable current source 116 for supplying a driving current to the electromagnet 115.

The direction of the magnetic field applied to the Faraday rotator 113 by the permanent magnet 114 is parallel to the transmission direction of a light beam 117 in the Faraday rotator 113, and the direction of the magnetic field applied to the Faraday rotator 113 by the electromagnet 115 is perpendicular to the magnetic field application direction by the permanent magnet 114 in the Faraday rotator 113 and the transmission direction of the light beam 117.

In FIG. 22B, each of arrows 102 and 105 denotes a vector indicating the direction of magnetization in the Faraday rotator 113 and its magnitude, and each of arrows 101, 104 and 103 denotes a vector indicating the direction and magnitude of an applied magnetic field applied from outside. In the drawing, a Z direction denotes the direction of propagation of light in the Faraday rotator 113, and an X direction is orthogonal to the Z direction. The Faraday rotator 113 is brought into a state of the saturation magnetization 102 by the vertical magnetic field 101 generated by the external permanent magnet 114. Next, when the horizontal magnetic field 103 generated by the electromagnet 115 is applied, the external magnetic field becomes the combined magnetic field 104, and the Faraday rotator 113 is brought into a state of the magnetization 105. The magnitude of the magnetization 105 is equal to the magnitude of the saturation magnetization 102. Accordingly, the Faraday rotator 113 is in the state of the saturation magnetization.

As stated above, the Faraday rotator 113 is put in the state of the saturation magnetization by previously applying the vertical magnetic field to the Faraday rotator 113 by the permanent magnet 114, and the horizontal magnetic field is applied by the electromagnet 115 disposed in the in-plane direction of the Faraday rotator 113. The direction of the magnetization of the Faraday rotator 113 is rotated by the combined magnetic field 104 of the two magnetic fields from the magnetization 102 to the magnetization 105 by an angle of θ, and the magnitude of a magnetization component 106 in the Z direction is controlled. The Faraday rotation angle is changed dependently on the magnitude of the magnetization component 106. In the case of this method, since the Faraday rotator 113 is always used in the saturation magnetization region, hysteresis does not occur, and there is a feature that the Faraday rotation angle can be changed with high reproducibility.

However, in the magnetic field application method disclosed in the patent document 1, since the magnetization is uniformly rotated in the state where the magnetic field in the vertical direction is applied by the permanent magnet 114, it is necessary to increase the magnetic field in the in-plane direction applied by the electromagnet 115. Thus, it is necessary to use the large electromagnet 115 or to supply a large current to the coil of the electromagnet 115. Accordingly, there arises a problem that it is difficult to miniaturize the magneto-optical component and to reduce electric power consumption. Besides, since the miniaturization of the magneto-optical component is difficult, there arises a problem that it is very difficult to form an array in which a plurality of magneto-optical components are arranged.

SUMMARY OF THE INVENTION

An object of the present invention is to provide a magneto-optical component, such as a variable light attenuator, a light modulator, or a light switch, which comprises small size, low power consumption, and high speed.

The above object is achieved by a magneto-optical component comprising at least one magneto-optical element comprising a magnetic domain A with magnetization in a direction not parallel to a light incident/exit surface, a magnetic domain B with magnetization in a direction opposite to the magnetization direction of the magnetic domain A, a planar magnetic domain wall as a boundary between the magnetic domain A and the magnetic domain B, and a plurality of light transmission regions through which a plurality of light beams comprising identical traveling directions are transmitted respectively, and a magnetic field application system for applying a variable magnetic field to the magneto-optical element to make a position of the magnetic domain wall variable.

In the magneto-optical component of the invention, distances between the magnetic domain wall and the plurality of light beams are almost equal to each other.

The magneto-optical component of the invention further comprises at least two birefringent plates, an axial shift direction of each of the birefringent plates is almost parallel to the magnetic domain wall, and the magneto-optical element is disposed between the first birefringent plate and the second birefringent plate.

The magneto-optical component of the invention further comprises at least three birefringent plates, the first magneto-optical element is disposed between the first birefringent plate and the second birefringent plate, the second magneto-optical element is disposed between the second birefringent plate and the third birefringent plate, magnetic domain walls of the first and the second magneto-optical elements are almost parallel to each other, and an axial shift direction of each of the first to the third birefringent plates is almost parallel to the magnetic domain walls of the first and the second magneto-optical elements.

In the magneto-optical component of the invention, a sum of an axial shift amount of the first birefringent plate and an axial shift amount of the third birefringent plate is almost equal to an axial shift amount of the second birefringent plate.

Besides, the above object is achieved by a magneto-optical component comprising at least one magneto-optical element comprising a magnetic domain A with magnetization in a direction not parallel to a light incident/exit surface, a magnetic domain B with magnetization in a direction opposite to the magnetization direction of the magnetic domain A, a planar magnetic domain wall as a boundary between the magnetic domain A and the magnetic domain B, a plurality of first light transmission regions through which a plurality of first light beams traveling in a specified direction are transmitted respectively, and a plurality of second light transmission regions through which a plurality of second light beams traveling in a direction substantially opposite to the specified direction are transmitted respectively, a reflecting part for reflecting the plurality of first light beams as the plurality of second light beams, and a magnetic field application system for applying a variable magnetic field to the magneto-optical element to make a position of the magnetic domain wall variable.

In the magneto-optical component of the invention, distances between the magnetic domain wall and the plurality of first light beams are almost equal to each other, and distances between the magnetic domain wall and the plurality of second light beams are almost equal to each other.

The magneto-optical component of the invention further comprises a first birefringent plate for separating light incident from outside into polarization components orthogonal to each other and sending them as the plurality of first light beams, at least one half-wave plate for causing polarization orientations of the plurality of first light beams to be coincident with each other and causing them to be incident on the magneto-optical element, and a second birefringent plate for combining the plurality of second light beams having been transmitted through the magneto-optical element and sending them to the outside.

Besides, the above object is achieved by a magneto-optical component comprising at least two optical waveguides, at least one magneto-optical element, comprising a magnetic domain A with magnetization in a direction not parallel to a light incident/exit surface on which light from the optical waveguide is incident or from which light to the optical waveguide is exited, a magnetic domain B with magnetization in a direction opposite to the magnetization direction of the magnetic domain A, and a planar magnetic domain wall as a boundary between the magnetic domain A and the magnetic domain B, and a magnetic field application system for applying a variable magnetic field to the magneto-optical element to make a position of the magnetic domain wall variable.

In the magneto-optical component of the invention, the optical waveguide comprises an optical fiber, and a lens directly fixed to a tip of the optical fiber.

In the magneto-optical component of the invention, the optical waveguide comprises an optical fiber comprising a core expansion region in a vicinity of its tip.

Besides, the above object is achieved by a magneto-optical component comprising at least two optical waveguides, at least one magneto-optical element comprising a magnetic domain A with magnetization in a direction not parallel to a light incident/exit surface on which light from the optical waveguide is incident or from which light to the optical waveguide is exited, a magnetic domain B with magnetization in a direction opposite to the magnetization direction of the magnetic domain A, and a planar magnetic domain wall as a boundary between the magnetic domain A and the magnetic domain B, and a magnetic field application system comprising an electromagnet comprising a yoke extending along the optical waveguides and a coil wound around the yoke and for applying a variable magnetic field to the magneto-optical element to make a position of the magnetic domain wall variable.

Besides, the above object is achieved by a magneto-optical component comprising a plurality of optical waveguide pairs each comprising at least two optical waveguides, at least one magneto-optical element comprising a magnetic domain A with magnetization in a direction not parallel to a light incident/exit surface on which light from the optical waveguides is incident or from which light to the optical waveguides is exited, a magnetic domain B with magnetization in a direction opposite to the magnetization direction of the magnetic domain A, and a planar magnetic domain wall formed to correspond to the optical waveguide pair and to become a boundary between the magnetic domain A and the magnetic domain B, and a magnetic field application system comprising an electromagnet comprising a yoke extending along the optical waveguides and a coil wound around the yoke and for applying a variable magnetic field to the magneto-optical element to make a position of the magnetic domain wall variable.

According to the invention, the magneto-optical component, such as a variable light attenuator, a light modulator or an optical switch, comprising small size, low power consumption, and high speed can be realized.

BRIEF DESCRIPTION OF THE DRAWINGS

FIGS. 1A to 1C are views for explaining the operation principle of a magneto-optical component according to a first embodiment of the invention;

FIGS. 2A to 2C are views for explaining the operation principle of the magneto-optical component according to the first embodiment of the invention;

FIGS. 3A to 3C are views for explaining the operation principle of the magneto-optical component according to the first embodiment of the invention;

FIGS. 4A to 4C are views showing a comparative example to the magneto-optical component according to the first embodiment of the invention;

FIGS. 5A to 5C are views showing the comparative example to the magneto-optical component according to the first embodiment of the invention;

FIGS. 6A to 6C are views showing the comparative example to the magneto-optical component according to the first embodiment of the invention;

FIGS. 8A and 8B are views for explaining an optical axis of a birefringent plate;

FIGS. 16A to 16D are views showing structural examples of an optical waveguide comprising a micro-collimator which is effective in decreasing a beam diameter of a light beam and can be miniaturized;

FIG. 17 is a view schematically showing a structure of a magneto-optical component comprising an optical waveguide;

DETAILED DESCRIPTION OF THE INVENTION

First Embodiment

Figure 7A:
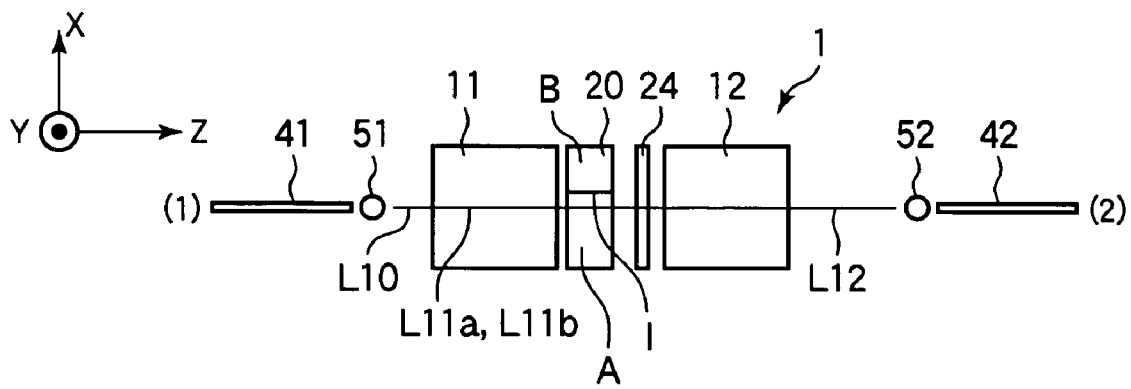
FIGS. 7A to 7C are views showing a structure of a transmission-type variable light attenuator as the magneto-optical component according to the first embodiment of the invention.

A magneto-optical component according to a first embodiment of the invention will be described with reference to FIGS. 1A to 8B. First, the operation principle of the magneto-optical component according to this embodiment will be described with reference to FIGS. 1A to 3C. FIGS. 1A to 3C show states in which a magnetic field is applied to a Faraday rotator 20 as a magneto-optical element while a condition is changed. FIGS. 1A, 2A and 3A show a state in which the Faraday rotator 20 is viewed in a direction perpendicular to a light incident/exit surface. Here, in optics, there is a case where the "light incident surface" is defined as a surface comprising an incident light beam and a normal of a boundary surface. However, the "light incident/exit surface" in the present specification is not defined in this way, but means a surface of the Faraday rotator 20 (or another optical element) on/from which light is incident/emerges. Two regions surrounded by two circles near the center of the Faraday rotator 20 and disposed in the vertical direction of the drawing are light transmission regions C1 and C2 through which two light beams comprising the same traveling direction are transmitted. For example, two linearly polarized lights comprising polarization orientations orthogonal to each other and traveling from this side of the paper toward the back side of the paper are respectively incident on the light transmission regions C1 and C2 of the Faraday rotator 20, the polarization orientations are rotated by specified angles, and are sent toward the back side of the paper. The Faraday rotator 20 is formed of, for example, a magnetic garnet single crystal film which is grown by a liquid phase epitaxial (LPE) method and comprises vertical magnetization properties in which an axis of easy magnetization appears in a direction perpendicular to a film growth surface. Permanent magnets M1 and M2, together with an after-mentioned electromagnet, constituting a magnetic field application system are disposed at both sides of the Faraday rotator 20. The two permanent magnets M1 and M2 comprise almost the same magnetic forces, and are disposed such that their magnetic poles are opposite to each other (directions of magnetizing are quite opposite to each other). For example, the magnetic flux in the inside of the permanent magnet M1 is directed from the back side of the paper to this side thereof, and the magnetic flux in the inside of the permanent magnet M2 is directed from this side of the paper to the back side thereof. Besides, the permanent magnet M2 is disposed at a position farther from the light transmission regions C1 and C2 of the Faraday rotator 20 than the permanent magnet M1.

FIGS. 1B, 2B and 3B schematically show sectional magnetic domain structures of the Faraday rotator 20 taken along lines X-X respectively shown in FIGS. 1A, 2A and 3A. In FIGS. 1B, 2B and 3B, the magnetic flux in the inside of the permanent magnet M1 is directed downward, and the magnetic flux in the inside of the permanent magnet M2 is directed upward.

FIGS. 1C, 2C and 3C respectively schematically show the direction and intensity of a magnetic field applied in a direction parallel to an optical axis (in a direction perpendicular to the light incident/exit surface of the Faraday rotator 20) by using the direction and length of an arrow. In the drawing, the horizontal direction corresponds to a position of the section of the Faraday rotator 20 in the horizontal direction, and the vertical direction indicates the direction parallel to the optical axis.

FIGS. 1A to 1C show a state in which the magnetic field is applied to the Faraday rotator 20 only by the permanent magnets M1 and M2. As shown in FIG. 1C, in a left portion of the Faraday rotator 20 near the permanent magnet M1, the magnetic field is applied upward in the drawing (that is, in FIG. 1A, toward the back side of the paper). On the other hand, in a right portion near the permanent magnet M2, the magnetic field is applied downward in the drawing (that is, in FIG. 1A, toward this side of the paper). The component of the magnetic field applied to the Faraday rotator 20 is monotonously changed in a specified direction on the light incident/exit surface. As indicated by the arrow in the Faraday rotator 20 of FIG. 1B, the direction of the magnetization in the Faraday rotator 20 becomes equal to the direction of the magnetic field applied to the Faraday rotator 20 by the permanent magnet M1 and the permanent magnet M2. Although the permanent magnets M1 and M2 comprise the magnetic forces almost equal to each other, since their magnetic poles are opposite to each other, and the permanent magnet M1 is closer to the Faraday rotator 20, in the inside of the Faraday rotator 20, as shown in FIG. 1C, the upward magnetic field, that is, the magnetic field comprising the same direction as the traveling direction of light becomes dominant. In a region in which a magnetic field of intensity higher than a saturation magnetic field is applied, a magnetic domain in which magnetization is uniformly made to comprise one direction is formed. Accordingly, as shown in FIG. 1B, in the inside of the Faraday rotator 20, a region of a magnetic domain A in which the magnetization is made uniformly upward (same direction as the traveling direction of light) becomes dominant over a region of a magnetic domain B in which the magnetic domain is uniformly made downward (direction opposite to the traveling direction of light). By this, as shown in FIGS. 1A and 1B, a planar boundary (hereinafter referred to as a magnetic domain wall I) between the magnetic domain A and the magnetic domain B is formed at a position O of the light incident/exit surface where the magnetic field in the vertical direction becomes 0.

In order to keep the magnetic domain wall I to be almost plane-shaped, it is sufficient if the gradient of the magnetic field intensity in the vicinity of the position O where the vertical direction magnetic field with respect to the light incident/exit surface shown in FIGS. 1C, 2C and 3C becomes 0 is sufficiently large. Besides, the magnetic domain wall I can be moved with good reproducibility and stably by applying uniform vertical direction magnetic field so that the position O becomes linear on the light incident/exit surface. By this, the magneto-optical component in which the hysteresis of the magnetic domain structure as the conventional problem does not occur and of which repeat reproducibility is excellent, can be realized.

Both the light transmission regions C1 and C2 are completely contained in the region of the magnetic domain A. Besides, the distance between the light transmission region C1 and the magnetic domain wall I (distance between the center position of the light beam transmitted through the light transmission region C1 and the magnetic domain wall I) is almost equal to the distance between the light transmission region C2 and the magnetic domain wall I (distance between the center position of the light beam transmitted through the light transmission region C2 and the magnetic domain wall I). Here, a Faraday rotation angle at a time when the light transmission regions C1 and C2 are located in the region of the magnetic domain A is made +θfs (saturation Faraday rotation angle). That is, both the two linearly polarized lights incident on the Faraday rotator 20 from this side of the paper and transmitted through the light transmission regions C1 and C2 are sent toward the back side of the paper after the polarization orientations are rotated by +θfs.

Here, the permanent magnet M1 is made closer to the Faraday rotator 20 than the permanent magnet M2, so that the light transmission regions C1 and C2 are contained in the region of the magnetic domain A. However, for example, a structure may be such that the magnetic force of the permanent magnet M1 is higher than the permanent magnet M2, and they are disposed to be almost equally distant from the Faraday rotator 20, so that the light transmission regions C1 and C2 are contained in the region of the magnetic domain A. Alternatively, a structure may be such that the permanent magnet M2 is not used, and only the permanent magnet M1 is used, so that the light transmission regions C1 and C2 are contained in the region of the magnetic domain A.

Next, in FIGS. 2A to 2C, electric power is applied to a not-shown electromagnet, and a magnetic field in a direction opposite to the traveling direction of the light is further added in addition to the magnetic fields generated by the permanent magnets M1 and M2, so that the position O where the magnetic field in the direction perpendicular to the light incident/exit surface is 0 is moved in the left direction of the drawing, and is made to be positioned almost at the center of the Faraday rotator 20. By this, as shown in FIG. 2C, the inside of the Faraday rotator 20 is brought into such a state that the upward (same direction as the traveling direction of the light) magnetic field is applied to the left half, and the downward (direction opposite to the traveling direction of the light) magnetic field is applied to the right half. Accordingly, as shown in FIG. 2B, the magnetic domain wall I is also moved in the left direction of the drawing, and is positioned almost at the center of the Faraday rotator 20. In the Faraday rotator 20, the region of the magnetic domain A in which the magnetization is uniformly made upward (same direction as the traveling direction of the light) and the region of the magnetic domain B in which the magnetization is uniformly made downward (direction opposite to the traveling direction of the light) are formed equally at both sides of the center magnetic domain wall I. By this, as shown in FIG. 2B, the region of the magnetic domain A and the region of the magnetic domain B equally exist in each of the light transmission regions C1 and C2. Since both the magnetic domains are equally contained, the Faraday rotation angle θf becomes 0°. That is, two linearly polarized lights incident on the Faraday rotator 20 from this side of the paper and transmitted through the light transmission regions C1 and C2 are sent toward the back side of the paper while the polarization orientations are not rotated.

Next, in FIGS. 3A to 3C, a large current is further supplied to the coil of the not-shown electromagnet to further add the magnetic field in the direction opposite to the traveling direction of the light, and as shown in FIG. 3C, the position O where the magnetic field in the direction perpendicular to the light incident/exit surface is 0 is further moved in the left direction of the drawing. By this, as shown in FIG. 3C, in the inside of the Faraday rotator 20, the downward magnetic field in the drawing (direction opposite to the traveling direction of the light) becomes dominant. Accordingly, as shown in FIG. 3B, in the Faraday rotator 20, the region of the magnetic domain B in which the magnetization is uniformly made downward (direction opposite to the traveling direction of the light) becomes dominant over the region of the magnetic domain A in which the magnetization is uniformly made upward (same direction as the traveling direction of the light). By this, as shown in FIG. 3A, both the light transmission regions C1 and C2 are completely contained in the region of the magnetic domain B. The Faraday rotation angle at a time when the light transmission regions C1 and C2 are located in the region of the magnetic domain B becomes −θfs. That is, both of two linearly polarized lights incident on the Faraday rotator 20 from this side of the paper and transmitted through the light transmission regions C1 and C2 are sent toward the back side of the paper after the polarization orientations are rotated by −θfs.

FIGS. 4A to 6C show states in which, while a condition is changed, a magnetic field is applied to a Faraday rotator 20 of a magneto-optical component as a comparative example to the magneto-optical component according to this embodiment. FIGS. 4A to 4C correspond to FIGS. 1A to 1C respectively, and show a state in which the magnetic field is applied to the Faraday rotator 20 only by permanent magnets M1 and M2. FIGS. 5A to 5C correspond to FIGS. 2A to 2C respectively, and show a state in which a magnetic field in a direction opposite to the traveling direction of light is applied by an electromagnet in addition to the magnetic fields generated by the permanent magnets M1 and M2. FIGS. 6A to 6C correspond to FIGS. 3A to 3C respectively, and show a state in which a magnetic field in the direction opposite to the traveling direction of the light is further intensely applied. As shown in FIGS. 4A to 6C, distances of the light transmission regions C1 and C2 of the Faraday rotator 20 from the magnetic domain wall I are different from each other, and in the state shown in FIG. 4A, the distance between the light transmission region C1 and the magnetic domain wall I is shorter than the distance between the light transmission region C2 and the magnetic domain wall I. In the state shown in FIGS. 4A to 4C, similarly to the state shown in FIGS. 1A to 1C, only the magnetic domain A exists in the light transmission regions C1 and C2. However, in the state shown in FIGS. 5A to 5C, while both the region of the magnetic domain A and the region of the magnetic domain B exist in the light transmission region C1, only the region of the magnetic domain A exists in the light transmission region C2. In the state shown in FIGS. 6A to 6C, while only the region of the magnetic domain B exists in the light transmission region C1, both the region of the magnetic domain A and the region of the magnetic domain B exist in the light transmission region C2.

As stated above, in the case where the distances between the magnetic domain wall I and the light transmission regions C1 and C2 are different from each other, Faraday rotation angles of two light beams transmitted through the light transmission regions C1 and C2 are different from each other. Accordingly, there is a problem that polarization dependency of the magneto-optical component becomes large. On the other hand, in this embodiment shown in FIGS. 1A to 3C, since the Faraday rotation angles of the two light beams transmitted through the light transmission regions C1 and C2 are identical to each other in any state, polarization independency of the magneto-optical component can be realized.

Figure 7B:
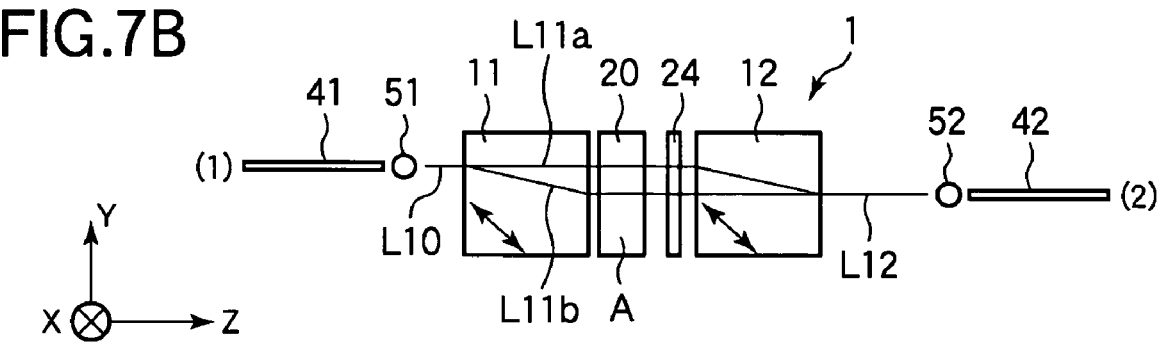
Figure 7C:
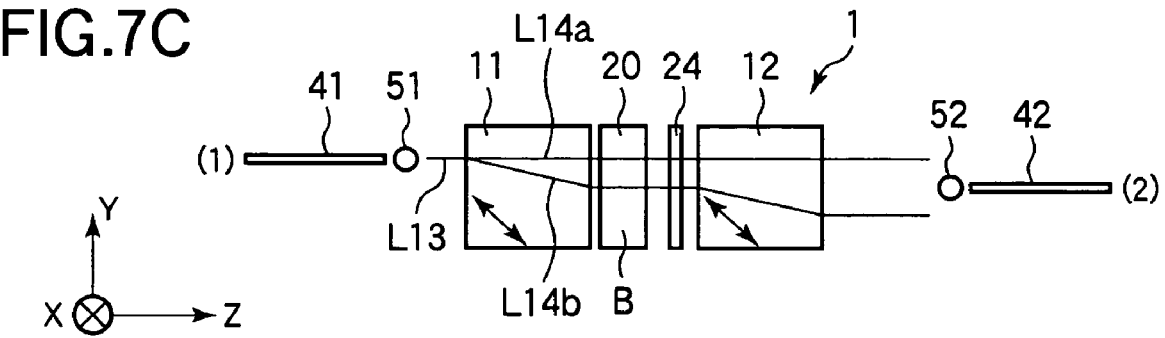

FIGS. 7A to 7C schematically show a structure of a transmission-type variable light attenuator 1 as a magneto-optical component according to this embodiment using the foregoing operation principle. In FIGS. 7A to 7C, the Z axis is taken in the traveling direction of light, and the Y axis is taken so that a magnetic domain wall I of a Faraday rotator 20 becomes parallel to the YZ plane. The X axis is taken in a direction orthogonal to the YZ plane. FIG. 7A shows the structure when the variable light attenuator 1 is viewed in the −Y direction, and FIGS. 7B and 7C show the structure when the variable light attenuator 1 is viewed in the +X direction. FIGS. 7A and 7B show a state (first state) in which two light transmission regions are completely contained in a region of a magnetic domain A, and FIG. 7C shows a state (second state) in which the two light transmission regions are completely contained in a region of a magnetic domain B.

As shown in FIGS. 7A to 7C, the variable light attenuator 1 is connected to an optical fiber 41 disposed on the −Z direction side and an optical fiber 42 disposed on the +Z direction side. An end of the optical fiber 41 on the −Z side is a light incident port P1 (denoted by (1) in the drawing) on which light is incident from outside. An end of the optical fiber 42 on the +Z side is a light exit port P2 (denoted by (2) in the drawing) from which light emerges to the outside.

A lens 51 for converting divergent light emerging from the optical fiber 41 into parallel light is disposed in the +Z direction of the optical fiber 41. A birefringent plate 11, a Faraday rotator 20, a half-wave plate 24, and a birefringent plate 12 are disposed in this order in the +Z direction of the lens 51. The birefringent plates 11 and 12, the half-wave plate 24, and the Faraday rotator 20 are parallel plate optical elements, and comprise light incident/exit surfaces almost parallel to the XY plane. A lens 52 for converting parallel light emerging from the birefringent plate 12 into convergent light and making it incident on the optical fiber 42 is disposed in the +Z direction of the birefringent plate 12.

The magnetic domain wall I of the Faraday rotator 20 parallel to the YZ plane is moved in the ±X direction by controlling a current supplied to an electromagnet (not shown). The Faraday rotation angle (+θfs) of the magnetic domain A of the Faraday rotator 20 is +45°, and the Faraday rotation angle (−θfs) of the magnetic domain B is −45°. The half-wave plate 24 rotates the polarization orientation of incident light by +45°. That is, when polarized light incident on the magnetic domain A of the Faraday rotator 20 is transmitted through the Faraday rotator 20 and the half-wave plate 24, its polarization orientation is rotated by 90°, and the light emerges from the half-wave plate 24. On the other hand, when polarized light incident on the magnetic domain B of the Faraday rotator 20 is transmitted through the Faraday rotator 20 and the half-wave plate 24, its polarization orientation is not rotated, and the light emerges from the half-wave plate 24. Incidentally, in this embodiment, although the half-wave plate 24 is disposed on the +Z direction side of the Faraday rotator 20 (between the Faraday rotator 20 and the birefringent plate 12), the half-wave plate 24 may be disposed on the −Z direction side of the Faraday rotator 20 (between the birefringent plate 11 and the Faraday rotator 20).

Here, the optical axes of the birefringent plates 11 and 12 will be described with reference to FIGS. 8A and 8B. FIG. 8A shows a state in which a birefringent plate BP is disposed in the XYZ coordinate system of FIGS. 7A to 7C and is viewed in the +Z direction, and FIG. 8B shows a state in which the birefringent plate BP is viewed in the +X direction. As shown in FIGS. 8A and 8B, an optical axis OA of the birefringent plate BP is disposed in parallel to the YZ plane. An angle between the optical axis OA and the Z axis is about 45° in a clockwise direction around the X axis when viewed in the +X direction. The light traveling in the +Z direction and vertically incident on the light incident/exit surface (parallel to the XY plane in this embodiment) of the birefringent plate BP is separated into an ordinary light and an extraordinary light, and they emerge on optical paths different from each other. At this time, the ordinary light travels in a straight line, and the extraordinary light is axially shifted, for example, downward (−Y direction) by a specified axial shift amount as shown in FIG. 8B with respect to the ordinary light. In FIG. 8B, the axial shift direction and axial shift amount of the extraordinary light are denoted by the direction and length of an arrow D. In the case where light traveling in the −Z direction is vertically incident on the light incident/exit surface BPb of the birefringent plate BP, the extraordinary light is axially shifted upward (+Y direction) by the same axial shift amount as the above with respect to the ordinary light.

Hereinafter, as shown in FIG. 8A, in the drawing in which the birefringent plate BP is viewed in the +Z direction, that the extraordinary light of light incident in the +Z direction is axially shifted downward (−Y direction) will be denoted by a downward single-pointed arrow C.

The birefringent plate 11 shown in FIGS. 7A to 7C comprises the optical axis (the direction of the optical axis is indicated by a double-pointed arrow in FIGS. 7A to 7C) in the same direction as the birefringent plate BP shown in FIGS. 8A and 8B. Accordingly, light incident on the birefringent plate 11 in the +Z direction is separated into an ordinary light and an extraordinary light, and they emerge on optical paths different from each other. At this time, the extraordinary light is axially shifted in the −Y direction by a specified axial shift amount with respect to the ordinary light.

The birefringent plate 12 comprises the optical axis in the same direction as the birefringent plate 11. Thus, the axial shift direction of the birefringent plate 12 is the same as the axial shift direction of the birefringent plate 11. The birefringent plates 11 and 12 are, for example, elements which are cut out from the same crystal into the same shape and comprise the same specification. Thus, the axial shift amount of the birefringent plate 12 is the same as the axial shift amount of the birefringent plate 11. As the crystal constituting the birefringent plates 11 and 12, rutile ($TiO_2$), yttrium vanadate (YVO4) or the like is used. Incidentally, based on optical characteristics of birefringent crystal, the birefringent plates 11 and 12 in which light traveling in the +Z direction is axially shifted in the +Y direction in the arrangement of the optical axis OA shown in FIGS. 8A and 8B may be combined to be used.

Besides, the birefringent plates 11 and 12 are disposed such that the axial shift directions become almost parallel to the magnetic domain wall I of the Faraday rotator 20. By this, the distance between the magnetic domain wall I and the light transmission region in which light having been transmitted through the birefringent plate 11 as the ordinary light is transmitted through the Faraday rotator 20 is almost equal to the distance between the magnetic domain wall I and the light transmission region in which light having been transmitted through the birefringent plate 11 as the extraordinary light and having been axially shifted is transmitted through the Faraday rotator 20.

Next, the operation of the transmission-type variable light attenuator 1 according to this embodiment will be described. First, the first state in which two light transmission regions are completely contained in the region of the magnetic domain A will be described. The first state is the state in which electric power is not applied to the electromagnet, and the magnetic field is applied to the Faraday rotator 20 only by the permanent magnets M1 and M2 (see FIGS. 1A to 1C). As shown in FIGS. 7A and 7B, light incident from the light incident port P1(1) is incident on the birefringent plate 11 as a light L10. The light L10 incident on the birefringent plate ii is separated into an ordinary light L11a and an extraordinary light L12b. That is, the light L11a of the ordinary light component travels in a straight line through the birefringent plate 11, and the light L11b of the extraordinary light component is axially shifted in the birefringent plate 11 by a specified axial amount in the −Y direction. The two lights L11a and L11b emerging from the birefringent plate 11 are incident on the Faraday rotator 20. Here, both the light transmission region in which the light L11a having been transmitted through the birefringent plate 11 as the ordinary light is transmitted through the Faraday rotator 20, and the light transmission region in which the light L11b having been transmitted through the birefringent plate 11 as the extraordinary light is transmitted through the Faraday rotator 20 are contained in the region of the magnetic domain A. Thus, the two lights L11a and L11b incident on the Faraday rotator 20 are transmitted through the Faraday rotator 20 and the half-wave plate 24, the polarization orientations are rotated by 90°, and the lights emerge from the half-wave plate 24 and are incident on the birefringent plate 12. Since the direction of the optical axis of the birefringent plate 12 is equal to the direction of the optical axis of the birefringent plate 11, the light L11a which has been transmitted through the birefringent plate 11 as the ordinary light and whose polarization orientation has been rotated by 90° is transmitted through the birefringent plate 12 as the extraordinary light, and the light L11b which has been transmitted through the birefringent plate 11 as the extraordinary light and whose polarization orientation has been rotated by 90° is transmitted through the birefringent plate 12 as the ordinary light. Accordingly, the light L11a is axially shifted in the birefringent plate 12 in the −Y direction by a specified axial shift amount, and the light L11b travels in a straight line through the birefringent plate 12. Since the axial shift amount in the birefringent plate 11 is equal to the axial shift amount in the birefringent plate 12, the two lights L11a and L11b are combined and emerge from the birefringent plate 12 as a light L12. The light L12 is incident on the light exit port P2(2) and emerges to the outside. All the light incident on the light incident port P1(1) in the first state emerges from the light exit port P2(2) independently of the polarization. Accordingly, in the first state, the amount of attenuation of light becomes minimum (almost 0).

Next, the second state in which the two light transmission regions are completely contained in the region of the magnetic domain B will be described. The second state is the state in which a large current is supplied to the coil of the electromagnet, and the magnetic field is applied to the Faraday rotator 20 by the electromagnet and the permanent magnets M1 and M2 (FIGS. 3A to 3C). As shown in FIG. 7C, light incident from the light incident port P1(1) is incident on the birefringent plate 11 as a light L13. The light L13 incident on the birefringent plate 11 is separated into an ordinary light L14a and an extraordinary light L14b, and they emerge from the birefringent plate 11. That is, the light L14a of the ordinary light component travels in a straight line through the birefringent plate 11, and the light L14b of the extraordinary light component is axially shifted in the birefringent plate 11 by a specified axial shift amount in the −Y direction. The two lights L14a and L14b emerging from the birefringent plate 11 are incident on the Faraday rotator 20. Here, both the light transmission region in which the light L14a having been transmitted through the birefringent plate 11 as the ordinary light is transmitted through the Faraday rotator 20, and the light transmission region in which the light L14b having been transmitted through the birefringent plate 11 as the extraordinary light and having been axially shifted is transmitted through the Faraday rotator 20 are contained in the region of the magnetic domain B. Thus, the two lights L14a and L14b incident on the Faraday rotator 20 are transmitted through the Faraday rotator 20 and the half-wave plate 24, the polarization orientations are not rotated, and the lights emerge from the half-wave plate 24 and are incident on the birefringent plate 12. Since the direction of the optical axis of the birefringent plate 12 is equal to the direction of the optical axis of the birefringent plate 11, the light L14a having been transmitted through the birefringent plate 11 as the ordinary light is transmitted also through the birefringent plate 12 as the ordinary light, and the light L14b having been transmitted through the birefringent plate 11 as the extraordinary light is transmitted also through the birefringent plate 12 as the extraordinary light. Accordingly, the light L14a travels in a straight line through the birefringent plate 12, and the light L14b is again axially shifted in the birefringent plate 12 by a specified axial shift amount in the −Y direction. Thus, the two lights L14a and L14b are not combined, and emerge from the birefringent plate 12 to different optical paths. These lights L14a and L14b are not incident on the light exit port P2(2), and do not emerge to the outside. The light incident on the light incident port P1(1) in the second state does not emerge from the light exit port P2(2) independently of the polarization. Accordingly, in the second state, the amount of attenuation of light becomes maximum.

As stated above, in the variable light attenuator 1, the amount of attenuation of light becomes almost 0 in the first state, and the amount of attenuation of light becomes maximum in the second state. Besides, in the variable light attenuator 1, the amount of attenuation of light can be continuously changed by controlling the current supplied to the coil of the electromagnet to move the magnetic domain wall I, and by gradually changing the magnetic domain structure in the light transmission regions C1 and C2 between the first state and the second state.

In the magnetic domain wall movement system as in this embodiment, since the direction of magnetization of the Faraday rotator 20 is not uniform, and the optical characteristics are different in the in-plane direction, it is considered to be difficult to decrease the polarization dependency. However, in this embodiment, the axial shift direction in each of the birefringent plates 11 and 12 is the Y direction, and the magnetic domain wall I is parallel to the YZ plane. As shown in FIG. 7A, the optical paths of the two lights L11a and L11b projected on the XZ plane perpendicular to the magnetic domain wall I are coincident to each other. Although not shown, also when the two lights L14a and L14b in the second state are similarly projected, the two optical paths are coincident. Since the axial shift direction in the birefringent plates 11 and 12 is parallel to the magnetic domain wall I, the two separated lights L11a and L11b (L14a and L14b) pass through the same magnetic domain of the Faraday rotator 20, and are subjected to the same optical effect. Therefore, according to this embodiment, the variable light attenuator 1 comprising low polarization dependency can be realized. Besides, since the optical path lengths of the light L11a and the light L11b are equal to each other, polarization mode dispersion is also very small.

As described above, according to the variable light attenuator 1 of this embodiment, not the magnetic field application system in which the magnetization of the magneto-optical element is uniformly rotated as disclosed in the patent document 1, but the system in which the magnetic domain structures in the light transmission regions C1 and C2 are changed is adopted, so that the Faraday rotation angle can be changed by a small electromagnet, and the small magneto-optical component can be realized. Besides, the response speed is generally limited by L (inductance) of the electromagnet, and when the electromagnet can be miniaturized, L can be reduced, and therefore, the speeding up of the response speed can be realized.

Second Embodiment

Figure 9A:
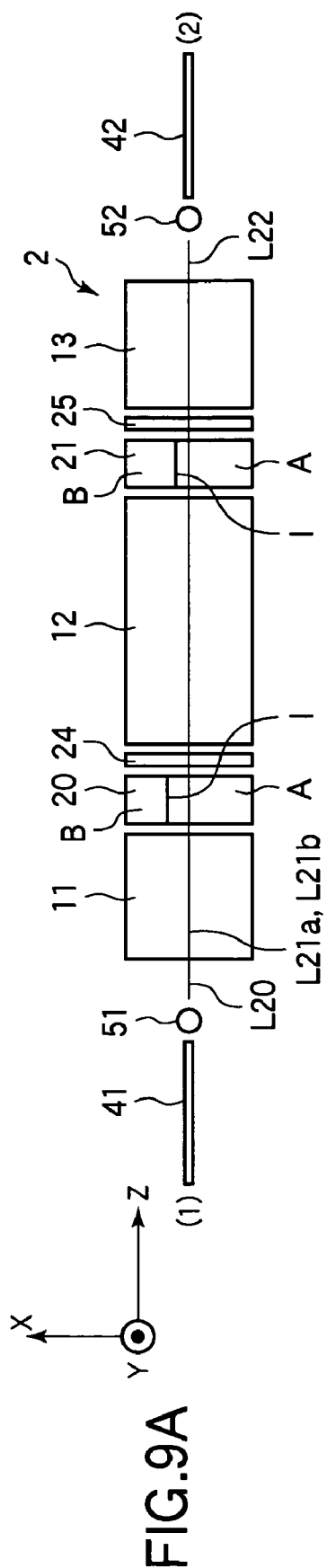
FIGS. 9A to 9C are views showing a structure of a transmission-type variable light attenuator as a magneto-optical component according to a second embodiment of the invention.
Figure 9B:
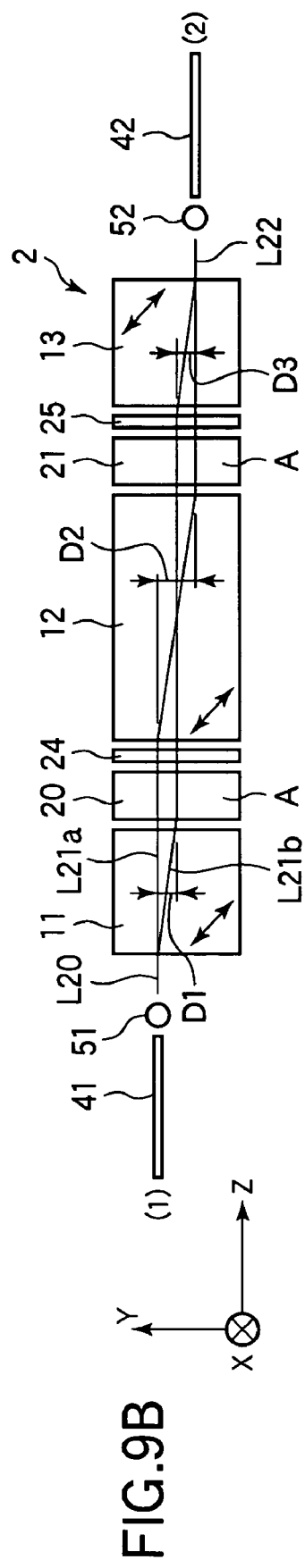
Figure 9C:
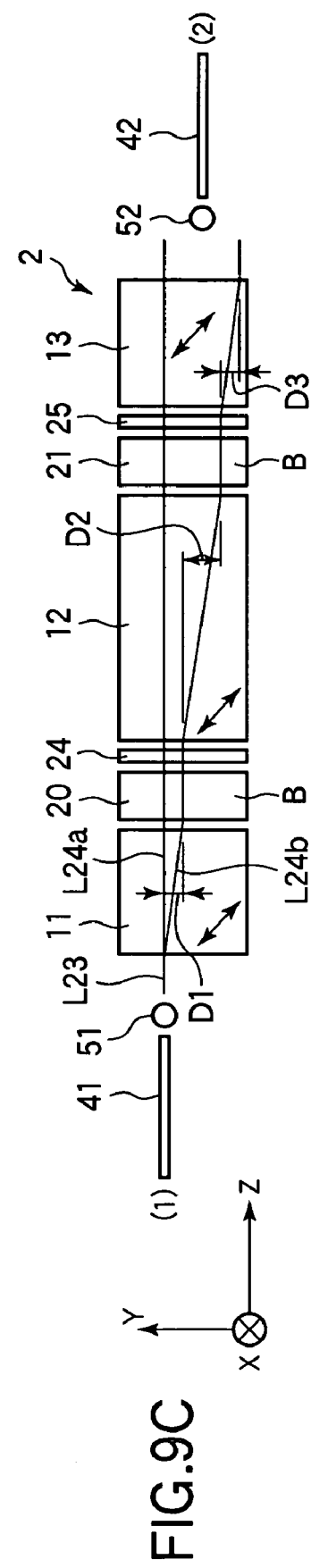

Next, a magneto-optical component according to a second embodiment will be described with reference to FIGS. 9A to 9C. FIGS. 9A to 9C schematically show a two-stage transmission-type variable light attenuator 2 as a magneto-optical component according to this embodiment. In FIGS. 9A to 9C, a coordinate system is adopted similarly to FIGS. 7A to 7C. FIG. 9A shows the structure of the variable light attenuator 2 when viewed in the −Y direction, and FIGS. 9B and 9C show the structure of the variable light attenuator 2 when viewed in the +X direction. FIGS. 9A and 9B show a state (first state) in which light transmission regions are completely contained in a region of a magnetic domain A, and FIG. 9C shows a state (second state) in which the light transmission regions are completely contained in a region of a magnetic domain B.

As shown in FIGS. 9A to 9C, the variable light attenuator 2 is connected to an optical fiber 41 disposed on the −Z direction side and an optical fiber 42 disposed on the +Z direction side. An end of the optical fiber 41 on the −Z side is a light incident port P1(1) on which light is incident from outside. An end of the optical fiber 42 on the +Z side is a light exit port P2(2). A lens 51 for converting divergent light emerging from the optical fiber 41 into parallel light is disposed in the +Z direction of the optical fiber 41. A birefringent plate 11, a Faraday rotator 20, a half-wave plate 24, a birefringent plate 12, a Faraday rotator 21, a half-wave plate 25, and a birefringent plate 13 are disposed in this order in the +Z direction of the lens 51. The birefringent plates 11, 12 and 13, the half-wave plates 24 and 25, and the Faraday rotators 20 and 21 are parallel-plate optical elements, and comprise light incident/exit surfaces almost parallel to the XY plane. A lens 52 for converting the parallel light emerging from the birefringent plate 13 into convergent light and making it incident on the optical fiber 42 is disposed in the +Z direction of the birefringent plate 13.

Both a magnetic domain wall I of the Faraday rotator 20 and a magnetic domain wall I of the Faraday rotator 21 are almost parallel to the YZ plane, and are disposed on, for example, the same plane. The magnetic domain wall I of the Faraday rotator 20 and the magnetic domain wall I of the Faraday rotator 21 are moved in the ±X direction by controlling a current supplied to an electromagnet (not shown). A Faraday rotation angle (+θfs) of the magnetic domain A of each of the Faraday rotators 20 and 21 is +45°, and a Faraday rotation angle (−θfs) of the magnetic domain B is −45°. The half-wave plates 24 and 25 rotate the polarization orientation of incident light by +45°. That is, polarized light incident on the magnetic domain A of the Faraday rotator 20 is transmitted through the Faraday rotator 20 and the half-wave plate 24, its polarization orientation is rotated by 90°, and the light emerges from the half-wave plate 24. Similarly, polarized light incident on the magnetic domain A of the Faraday rotator 21 is transmitted through the Faraday rotator 21 and the half-wave plate 25, its polarization orientation is rotated by 90°, and the light emerges from the half-wave plate 25. On the other hand, polarized light incident on the magnetic domain B of the Faraday rotator 20 is transmitted through the Faraday rotator 20 and the half-wave plate 24, and emerges from the half-wave plate 24 while its polarization orientation is not rotated. Similarly, polarized light incident on the magnetic domain B of the Faraday rotator 21 is transmitted through the Faraday rotator 21 and the half-wave plate 25, and emerges from the half-wave plate 25 while its polarization orientation is not rotated. Incidentally, in this embodiment, although the half-wave plate 24 is disposed on the +Z direction side of the Faraday rotator 20 (between the Faraday rotator 20 and the birefringent plate 12), the half-wave plate 24 may be disposed on the −Z direction side of the Faraday rotator 20 (between the birefringent plate 11 and the Faraday rotator 20). Besides, in this embodiment, although the half-wave plate 25 is disposed on the +Z direction side of the Faraday rotator 21 (between the Faraday rotator 21 and the birefringent plate 13), the half-wave plate 25 may be disposed on the −Z direction side of the Faraday rotator 21 (between the birefringent plate 12 and the Faraday rotator 21).

The birefringent plates 11, 12 and 13 comprise the same direction of the optical axis as the birefringent plate BP shown in FIGS. 8A and 8B. Thus, all the axial shift directions of the birefringent plates 11, 12 and 13 are equal to each other. An axial shift amount D1 of the birefringent plate 11 is the same as an axial shift amount D3 of the birefringent plate 13. That is, the birefringent plates 11 and 13 comprise the same axial shift direction and the same axial shift amount, and for example, elements cut out from the same crystal into the same shape and comprising the same specification are used. Besides, the axial shift direction of the birefringent plate 12 is equal to the axial shift directions of the birefringent plates 11 and 13, and an axial shift amount D2 of the birefringent plate 12 is twice as large as the axial shift amount D1 or D3 of the birefringent plate 11 or 13 (D1:D2:D3=1:2:1). Incidentally, the relation among the axial shift amounts D1, D2 and D3 is not limited to the above, and it is sufficient if the sum of the axial shift amounts D1 and D3 is almost equal to the axial shift amount D2 (D1+D3≈D2).

The birefringent plates 11, 12 and 13 are disposed such that the axial shift directions become almost parallel to the magnetic domain wall I of the Faraday rotator 20 and the magnetic domain wall I of the Faraday rotator 21. By this, the distances of the two light transmission regions of the Faraday rotator 20 from the magnetic domain wall I of the Faraday rotator 20 are almost equal to each other. Similarly, the distances of the two light transmission regions of the Faraday rotator 21 from the magnetic domain wall I of the Faraday rotator 21 are almost equal to each other.

Next, the operation of the transmission-type variable light attenuator 2 according to this embodiment will be described. First, a description will be given to the first state in which the two light transmission regions of the Faraday rotator 20 and the two light transmission regions of the Faraday rotator 21 are completely contained in the region of the magnetic domain A. The first state is the state in which electric power is not applied to the electromagnet, and the magnetic field is applied to the Faraday rotators 20 and 21 only by the permanent magnets. As shown in FIGS. 9A and 9B, light incident from the light incident port P1(1) is incident on the birefringent plate 11 as a light L20. The light L20 incident on the birefringent plate 11 is separated into an ordinary light L21a and an extraordinary light L21b, and they emerge from the birefringent plate 11. That is, the light L21a of the ordinary light component travels in a straight line through the birefringent plate 11, and the light L21b of the extraordinary light component is axially shifted in the birefringent plate 11 by the axial shift amount D1 in the −Y direction. The two lights L21a and L21b emerging from the birefringent plate 11 are incident on the Faraday rotator 20. Here, both the light transmission region in which the light L21a having been transmitted through the birefringent plate 11 as the ordinary light is transmitted through the Faraday rotator 20, and the light transmission region in which the light L21b having been transmitted through the birefringent plate 11 as the extraordinary light and having been axially shifted is transmitted through the Faraday rotator 20 are contained in the region of the magnetic domain A. Thus, the two lights L21a and L21b incident on the Faraday rotator 20 are transmitted through the Faraday rotator 20 and the half-wave plate 24, the polarization orientations are rotated by 90°, and the lights emerge from the half-wave plate 24 and are incident on the birefringent plate 12. Since the direction of the optical axis of the birefringent plate 12 is equal to the direction of the optical axis of the birefringent plate 11, the light L21a which has been transmitted through the birefringent plate 11 as the ordinary light and whose polarization orientation has been rotated by 90° is transmitted through the birefringent plate 12 as the extraordinary light. The light L21b which has been transmitted through the birefringent plate 11 as the extraordinary light and whose polarization orientation has been rotated by 90° is transmitted through the birefringent plate 12 as the ordinary light. Accordingly, the light L21a is axially shifted in the birefringent plate 12 by the axial shift amount D2 in the −Y direction, and the light L21b travels in a straight line through the birefringent plate 12.

The two lights L21a and L21b emerging from the birefringent plate 12 are incident on the Faraday rotator 21. Here, both the light transmission region in which the light L21a having been transmitted through the birefringent plate 12 as the extraordinary light is transmitted through the Faraday rotator 21, and the light transmission region in which the light L21b having been transmitted through the birefringent plate 12 as the ordinary light is transmitted through the Faraday rotator 21 are contained in the region of the magnetic domain A. Thus, the two lights incident on the Faraday rotator 21 are transmitted through the Faraday rotator 21 and the half-wave plate 25, the polarization orientations are rotated by 90°, and the lights emerge from the half-wave plate 25 and are incident on the birefringent plate 13. Since the direction of the optical axis of the birefringent plate 13 is equal to the direction of the optical axis of each of the birefringent plates 11 and 12, the light L21a which has been transmitted through the birefringent plate 12 as the extraordinary light and whose polarization orientation has been rotated by 90° is transmitted through the birefringent plate 13 as the ordinary light. The light L21b which has been transmitted through the birefringent plate 12 as the ordinary light and whose polarization orientation is rotated by 90° is transmitted through the birefringent plate 13 as the extraordinary light. Accordingly, the light L21a travels in a straight line through the birefringent plate 13, and the light L21b is axially shifted in the birefringent plate 13 by the axial shift amount D3 in the −Y direction.

While the light L21a is axially shifted in the birefringent plate 12 by the axial shift amount D2 in the −Y direction, the light L21b is axially shifted in the birefringent plate 11 by the axial shift amount D1 in the −Y direction and is further axially shifted in the birefringent plate 13 by the axial shift amount D3 in the −Y direction. As described above, because D1+D3=D2, the two lights L21a and L21b are combined and emerge from the birefringent plate 13 as a light L22. The light L22 is incident on the light exit port P2(2) and emerges to the outside. All the light incident on the light incident port P1(1) in the first state emerges from the light exit port P2(2) independently of the polarization. Accordingly, in the first state, the amount of attenuation of light becomes minimum (almost 0).

Next, a description will be given to the second state in which the two light transmission regions of the Faraday rotator 20 and the two light transmission regions of the Faraday rotator 21 are completely contained in the region of the magnetic domain B. The second state is the state in which a large current is supplied to the coil of the electromagnet, and the magnetic field is applied to the Faraday rotators 20 and 21 by the electromagnet and the permanent magnets. As shown in FIG. 9C, light incident from the light incident port P1(1) is incident on the birefringent plate 11 as a light L23. The light L23 incident on the birefringent plate 11 is separated into an ordinary light L24a and an extraordinary light L24b, and they emerge from the birefringent plate 11. That is, the light L24a of the ordinary light component travels in a straight line through the birefringent plate 11, and the light L24b of the extraordinary light component is axially shifted in the birefringent plate 11 by the axial shift amount D1 in the −Y direction. The two lights L24a and L24b emerging from the birefringent plate 11 are incident on the Faraday rotator 20. Here, both the light transmission region in which the light L24a having been transmitted through the birefringent plate 11 as the ordinary light is transmitted through the Faraday rotator 20, and the light transmission region in which the light L24b having been transmitted through the birefringent plate 11 as the extraordinary light and having been axially shifted is transmitted through the Faraday rotator 20 are contained in the region of the magnetic domain B. Thus, the two lights L24a and L24b incident on the Faraday rotator 20 are transmitted through the Faraday rotator 20 and the half-wave plate 24, the polarization orientations are not rotated, and the lights emerge from the half-wave plate 24 and are incident on the birefringent plate 12. Since the direction of the optical axis of the birefringent plate 12 is equal to the direction of the optical axis of the birefringent plate 11, the light L24a having been transmitted through the birefringent plate 11 as the ordinary light is transmitted also through the birefringent plate 12 as the ordinary light, and the light L24b having been transmitted through the birefringent plate 11 as the extraordinary light is transmitted also through the birefringent plate 12 as the extraordinary light. Accordingly, the light L24a travels in a straight line through the birefringent plate 12, and the light L24b is further axially shifted in the birefringent plate 12 by the axial shift amount D2 in the −Y direction.

The two lights L24a and L24b emerging from the birefringent plate 12 are incident on the Faraday rotator 21. Here, both the light transmission region in which the light L24a having been transmitted through the birefringent plate 12 as the ordinary light is transmitted through the Faraday rotator 21 and the light transmission region in which the light L24b having been transmitted through the birefringent plate 12 as the extraordinary light is transmitted through the Faraday rotator 21 are contained in the region of the magnetic domain B. Thus, the two lights L24a and L24b incident on the Faraday rotator 21 are transmitted through the Faraday rotator 21 and the half-wave plate 25, the polarization orientations are not rotated, and the lights emerge from the half-wave plate 25 and are incident on the birefringent plate 13. Since the direction of the optical axis of the birefringent plate 13 is equal to the direction of the optical axis of each of the birefringent plates 11 and 12, the light L24a having been transmitted through the birefringent plate 12 as the ordinary light is transmitted also through the birefringent plate 13 as the ordinary light, and the light L24b having been transmitted through the birefringent plate 12 as the extraordinary light is transmitted also through the birefringent plate 13 as the extraordinary light. Accordingly, the light L24a travels in a straight line through the birefringent plate 13, and the light L24b is further axially shifted in the birefringent plate 13 by the axial shift amount D3 in the −Y direction.

While the light L24a is transmitted through the birefringent plates 11, 12 and 13 without axial shift, the light L24b is transmitted through the birefringent plates 11, 12 and 13 and by this axially shifted by the axial shift amount (D1 +D2+D3) in the −Y direction. Thus, the two lights L24a and L24b are not combined and emerge from the birefringent plate 13 to different optical paths. These lights L24a and L24b are not incident on the light exit port P2(2) and do not emerge to the outside. The light incident on the light incident port P1(1) in the second state does not emerge from the light exit port P2(2) independently of the polarization. Accordingly, in the second state, the amount of attenuation of light becomes maximum.

As stated above, in the variable light attenuator 2, the amount of attenuation of light becomes almost 0 in the first state, and the amount of attenuation of light becomes maximum in the second state. Besides, in the variable light attenuator 2, the amount of attenuation of light can be continuously changed by controlling the current supplied to the coil of the electromagnet to move the magnetic domain wall I and by gradually changing the magnetic domain structure in the light transmission region between the first state and the second state.

According to the variable light attenuator 2 of this embodiment, similarly to the first embodiment, since the system is such that the magnetic domain structure in the light transmission region is changed, the small and high-speed magneto-optical component can be realized.

Besides, in this embodiment, the axial shift directions in the birefringent plates 11, 12 and 13 are the Y direction, and the magnetic domain wall I of the Faraday rotator 20 and the magnetic domain wall I of the Faraday rotator 21 are parallel to the YZ plane. As shown in FIG. 9A, the optical paths of the two lights L21a and L21b projected on the XZ plane perpendicular to the magnetic domain wall I are coincident with each other. Since the axial shift directions in the birefringent plates 11, 12 and 13 are parallel to the magnetic domain wall I, and the two separated lights L21a and L21b pass through the same magnetic domains of the Faraday rotators 20 and 21 and are subjected to the same optical effect. Therefore, according to this embodiment, the variable light attenuator 2 comprising low polarization dependency can be realized. Besides, the light L21a and the light L21b comprise equal optical path lengths, and there is no polarization mode dispersion. Further, the structure of FIG. 9 comprises two stages each comprising the structure of FIG. 7, and a very high amount of attenuation of 50 dB or higher can be obtained, and accordingly, the attenuator can also be used as an optical shutter. According to the first embodiment, the incident light is rotated by 90° and emerges. However, according to this embodiment, since the incident polarized light is returned to the original state and emerges, the polarization directions of the incident light and the outgoing light are held.

Third Embodiment

Figure 10A:
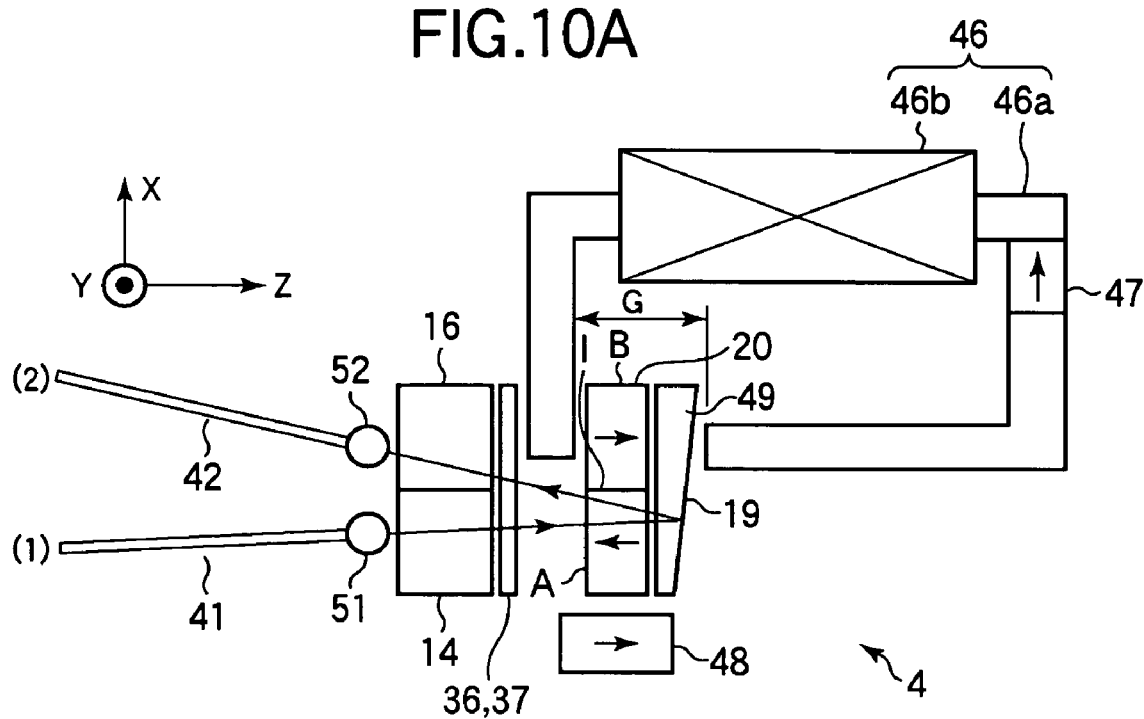
FIGS. 10A and 10B are views showing a structure of a magneto-optical component according to a third embodiment of the invention.
Figure 10B:
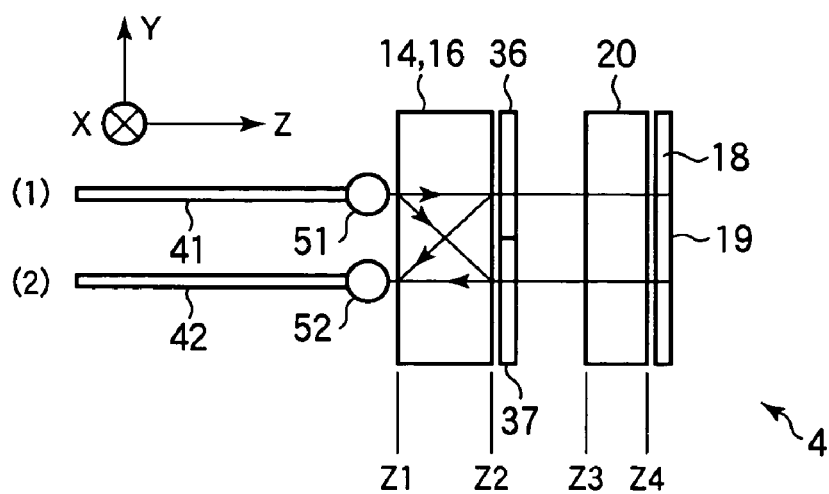

Next, a magneto-optical component according to a third embodiment of the invention will be described with reference to FIGS. 10A to 13. FIGS. 10A and 10B schematically show a structure of a reflection-type variable light attenuator 4 as the magneto-optical component according to this embodiment. In FIGS. 10A and 10B, the Z axis is taken in the traveling direction of light, and the direction in which light from outside travels toward a reflecting film 19 comprised in the variable light attenuator 4 is made the +Z direction. The X axis and Y axis are taken in two directions orthogonal to each other on a plane orthogonal to the Z axis. FIG. 10A shows the structure of the variable light attenuator 4 when viewed in the −Y direction, and FIG. 10B shows the structure of the variable light attenuator 4 when viewed in the +X direction. As shown in FIGS. 10A and 10B, the variable light attenuator 4 is connected to two optical fibers 41 and 42. An end of the optical fiber 41 on the −Z side is a light incident port P1 on which light is incident from outside. An end of the optical fiber 42 on the −Z side is a light exit port P2 from which light emerges to the outside. Lenses 51 and 52 for converting divergent lights emerging from the optical fibers 41 and 42 into parallel lights are respectively disposed in the +Z directions of the respective optical fibers 41 and 42.

A birefringent plate 14 is disposed in the +Z direction of the lens 51, and a birefringent plate 16 is disposed in the +Z direction of the lens 52. The birefringent plates 14 and 16 are disposed to be adjacent to each other in the ±X direction, and respectively comprise light incident/exit surfaces perpendicular to the Z axis. The direction of an optical axis OA14 (not shown) of the birefringent plate 14 and the axial shift direction of an extraordinary light are the same as those of the birefringent plate BP shown in FIGS. 8A and 8B. The direction of an optical axis OA16 (not shown) of the birefringent plate 16 and the axial shift direction of an extraordinary light are equal to those in a state in which the birefringent plate 14 is rotated around the Z axis by 180°. In the +Z direction of the birefringent plates 14 and 16, a half-wave plate 36 is disposed at a position (+Y side) corresponding to the lens 51 and a half-wave plate 37 is disposed at a position (−Y side) corresponding to the lens 52. A Faraday rotator 20 is disposed in the +Z direction of the half-wave plates 36 and 37. A magnetic field with a specified distribution is applied to the Faraday rotator 20 by an electromagnet 46 and a permanent magnet 48 disposed around the Faraday rotator 20, and a magnetic domain structure is formed. A wedge birefringent crystal plate 49 is disposed in the +Z direction of the Faraday rotator 20. An optical axis OA49 (not shown) of the wedge birefringent crystal plate 49 is parallel to the X axis direction. Instead of the wedge birefringent crystal plate 49, a polarizing plate or the like can also be used. A reflecting film (reflecting part) 19 is, for example, directly formed on the surface of the wedge birefringent crystal plate 49 on the +Z side. The reflecting surface of the reflecting film 19 is non-parallel to, for example, a light incident/exit surface of another optical element.

The electromagnet 46 is disposed in the +X direction of the Faraday rotator 20, and comprises a yoke 46a and a coil 46b wound around the yoke 46a. Both ends of the yoke 46a are opposite to each other through the +X side end of the Faraday rotator 20 and that of the wedge birefringent crystal plate 49. Besides, the yoke 46a comprises a permanent magnet 47 as a part thereof. Since the permanent magnet 47 is provided, even in the state where electric power is not applied to the coil 46b, a bias magnetic field in the +Z direction is applied to the +X side region of the Faraday rotator 20 at the intensity of a saturation magnetic field or higher. The permanent magnet 48 is disposed in the −X direction of the Faraday rotator 20. The magnetic field in the −Z direction is applied to the −X side region of the Faraday rotator 20 by the permanent magnet 48 at the intensity of the saturation magnetic field or higher. By this, a magnetic domain A in which magnetization is uniformly directed in the −Z direction is formed in the −X side region of the Faraday rotator 20, and a magnetic domain B in which magnetization is uniformly directed in the +Z direction is formed in the +X side region thereof. A linear magnetic domain wall I parallel to the YZ plane is formed at a boundary between the magnetic domain A and the magnetic domain B. In the state where electric power is not applied to the coil 46b, the magnetic domain wall I is positioned on the +X side of the light transmission region of the Faraday rotator, and the light transmission region is contained in the region of the magnetic domain A. When electric power is applied to the coil 46b, and a variable magnetic field in the +Z direction is further applied to the Faraday rotator 20 by the electromagnet 46, the magnetic domain wall I is moved in the −X direction, and the region of the magnetic domain B is increased in the light transmission region. The position of the magnetic domain wall I in the ±X direction can be adjusted by adjusting current supplied to the coil 46b of the electromagnet 46. FIGS. 10A and 10B also show an optical path of light incident from the light incident port P1 in a first state described later.

As stated above, in this embodiment, the electromagnet 46 is disposed on the one end side of the Faraday rotator 20, and the permanent magnet 48 is disposed on the other end side. In this embodiment, even if an interval G between both the ends of the yoke 46a is made narrow, the distance from the permanent magnet 48 is relatively long, the magnetic field to be applied by the permanent magnet 48 is not shielded by the yoke 46a. Accordingly, the interval G between both the ends of the yoke 46a can be made significantly narrow.

While the two Faraday rotators 20 and 21 are used for the transmission-type variable light attenuator 2 shown in FIGS. 9A to 9C, the two-stage variable light attenuator 4 can be realized in this embodiment by using only one Faraday rotator 20. Besides, the optical fibers 41 and 42 are disposed only on one side of the variable light attenuator 4. Accordingly, it is easy to achieve miniaturization of the variable light attenuator 4 and reduction in cost. Besides, according to this embodiment, since application efficiency of the magnetic field by the electromagnet 46 can be raised by narrowing the interval G, the small electromagnet 46 can be used, or the current supplied to the coil 46b of the electromagnet 46 can be decreased. Accordingly, the variable light attenuator 4 can be further miniaturized and power consumption can be reduced, and further, the response speed can be raised.

Figure 11:
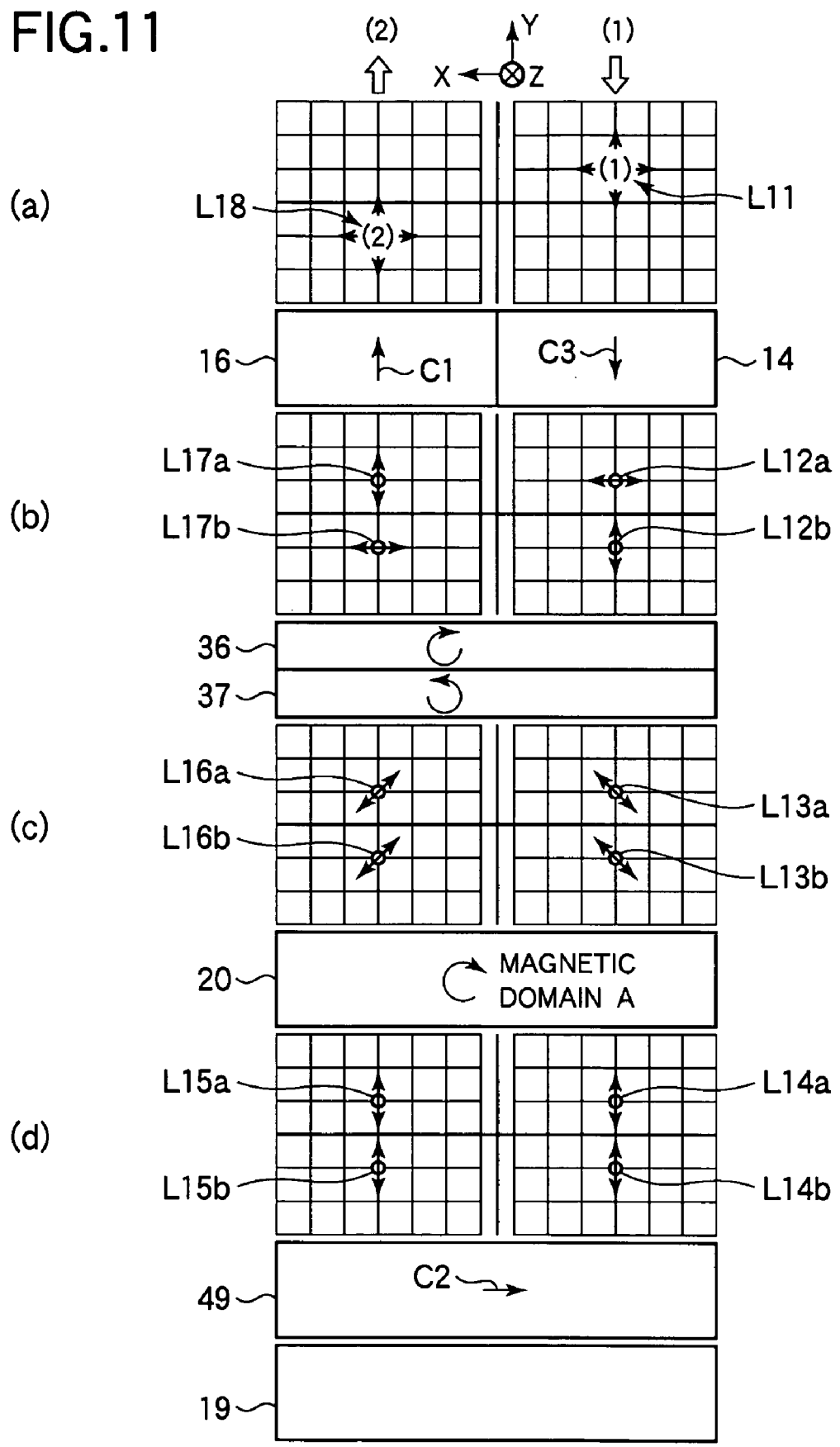
FIG. 11 is a view showing the operation of the magneto-optical component according to the third embodiment of the invention.
Figure 12:
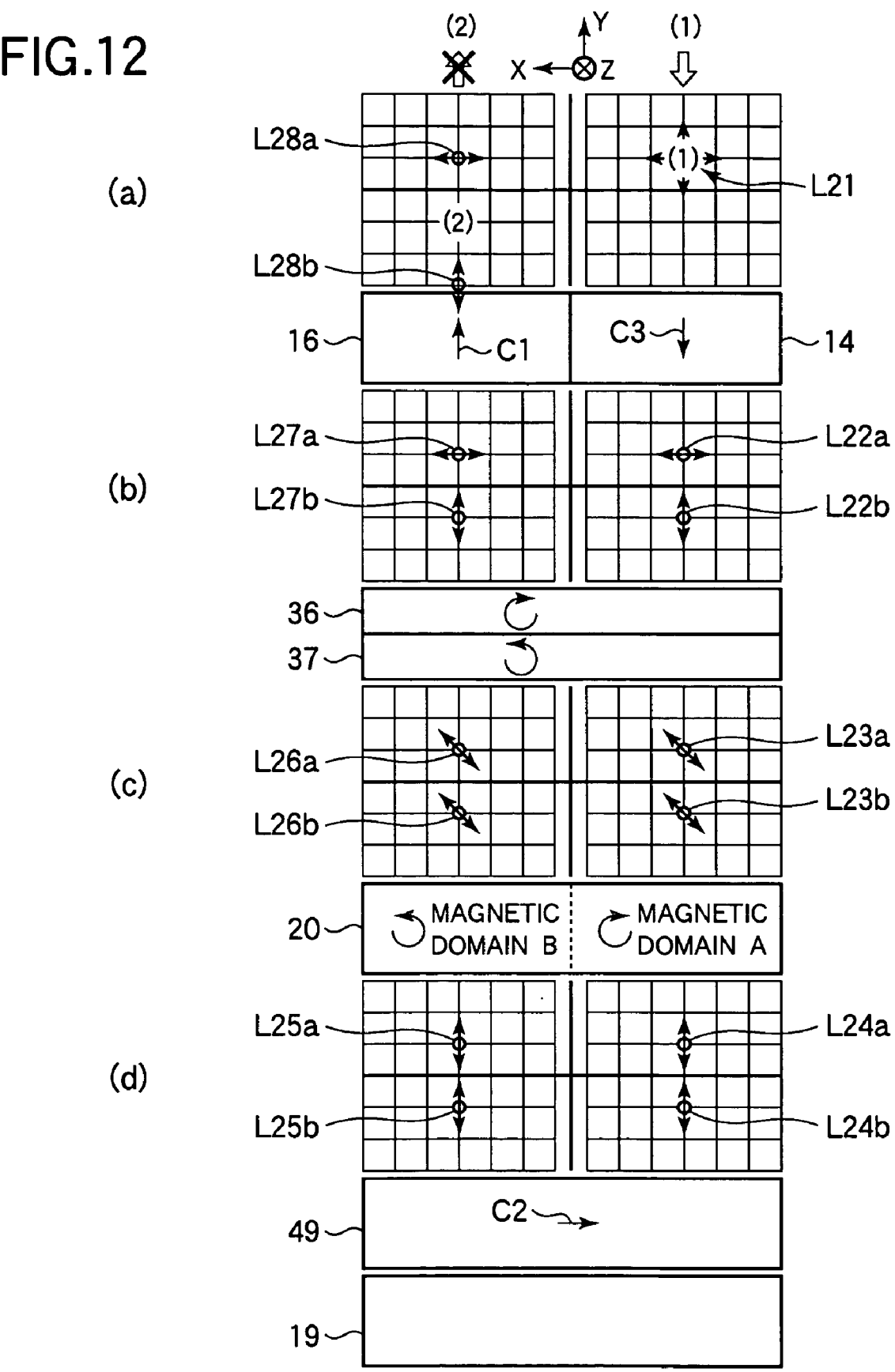
FIG. 12 is a view showing the operation of the magneto-optical component according to the third embodiment of the invention.
Figure 13:
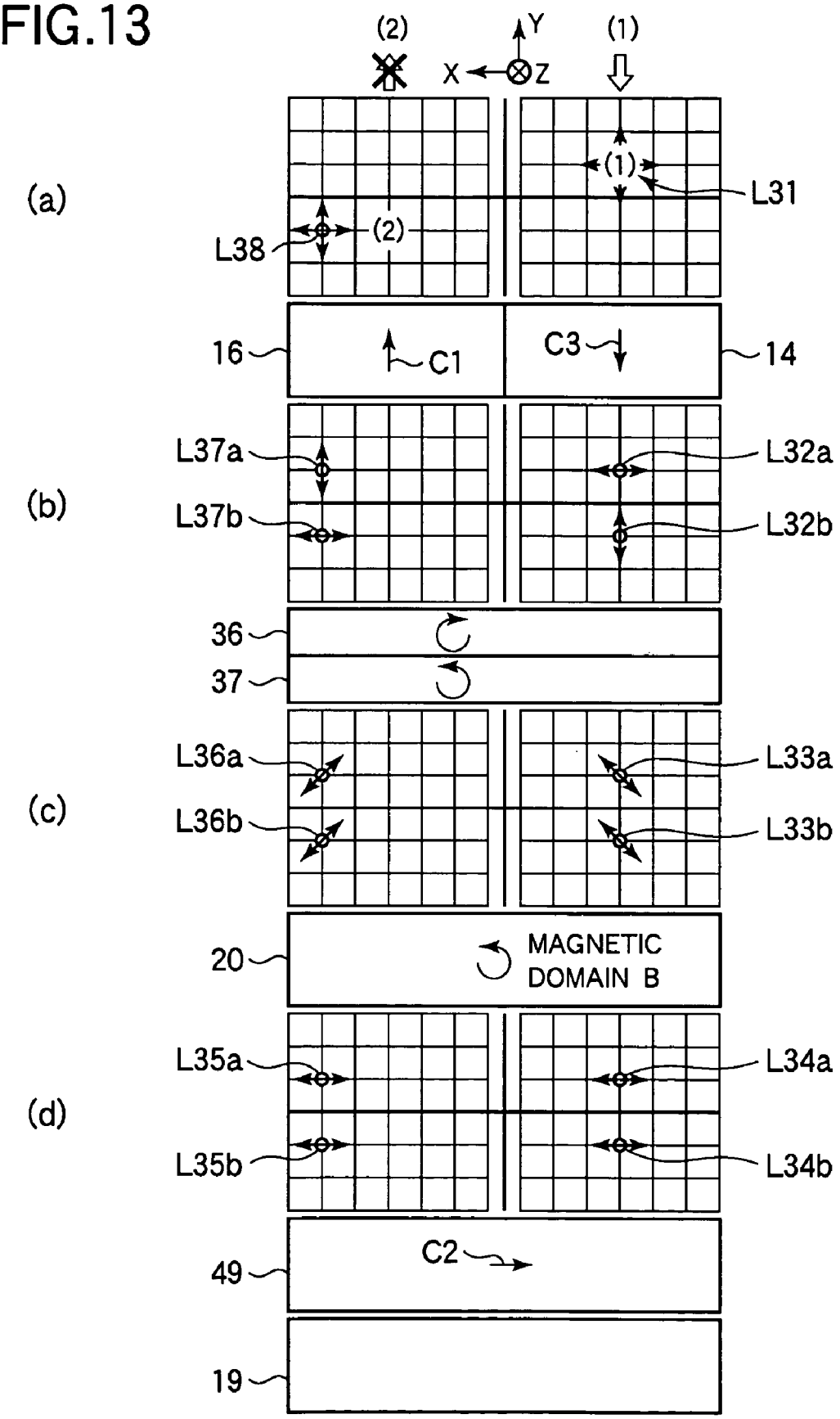
FIG. 13 is a view showing the operation of the magneto-optical component according to the third embodiment of the invention.

Next, the operation of the variable light attenuator 4 according to this embodiment will be described. FIGS. 11 to 13 are views in which polarization states of light transmitted through the respective optical elements constituting the variable light attenuator 4 are viewed in the +Z direction. Parts (a) of FIGS. 11 to 13 show the polarization states of light at light incident/exit surfaces Z1 of the birefringent plates 14 and 16 on the −Z side as shown in FIGS. 10A and 10B. Parts (b) of FIGS. 11 to 13 show the polarization states of light at light incident/exit surfaces Z2 of the birefringent plates 14 and 16 on the +Z side. Parts (c) of FIGS. 11 to 13 show the polarization states of light at a light incident/exit surface Z3 of the Faraday rotator 20 on the −Z side. Parts (d) of FIGS. 11 to 13 show the polarization states of light at a light incident/exit surface Z4 of the Faraday rotator 20 on the +Z side. For facilitating the understanding, FIGS. 11 to 13 schematically show also states in which the birefringent plates 14 and 16, the half-wave plates 36 and 37, the Faraday rotator 20, the wedge birefringent crystal plate 49, and the reflecting film 19 are viewed in the +Z direction. Besides, in the parts (a) to (d), imaginary grids are shown in order to indicate positions of the respective lights. Besides, polarization orientations of the respective lights are indicated by double-pointed arrows.

First, the state of light incident from the light incident port P1(1) in the state (first state) in which the magnetic domain A is formed in almost the whole of the Faraday rotator 20 will be described with reference to FIG. 11. As shown on the right of FIG. 11(a), a light L11 incident from the light incident port P1 is incident on the birefringent plate 14. As shown on the right of FIG. 11(b), the light L11 incident on the birefringent plate 14 is separated into an ordinary light L12a and an extraordinary light L12b axially shifted in the direction of an arrow C3, and they emerge from the birefringent plate 14. Next, the light L12a of the ordinary light component is incident on the half-wave plate 36, and the light L12b of the extraordinary light component is incident on the half-wave plate 37. As shown on the right of FIG. 11(c), the light L12a emerges from the half-wave plate 36 as a light L13a whose polarization orientation is rotated clockwise around the Z axis by 45° when viewed in the +Z direction. The light L12b emerges from the half-wave plate 37 as a light L13b whose polarization orientation is rotated counterclockwise around the Z axis by 45° when viewed in the +Z direction. The polarization orientations of the lights L13a and L13b become identical to each other. Next, the lights L13a and L13b are incident on the region of the magnetic domain A of the Faraday rotator 20. As shown on the right of FIG. 11(d), the lights L13a and L13b emerge from the Faraday rotator 20 as lights L14a and L14b respectively whose polarization orientations are rotated clockwise around the Z axis by 45° when viewed in the +Z direction. By this, the polarization orientations of the lights L14a and L14b become perpendicular to the plane formed by intersection of a straight line parallel to the traveling directions of the lights L14a and L14b and a straight line parallel to the optical axis of the wedge birefringent crystal plate 49. The lights L14a and L14b are incident on the wedge birefringent crystal plate 49 as the ordinary light, are reflected by the reflecting surface of the reflecting film 19, and emerge, as shown on the left of FIG. 11(d), from the wedge birefringent crystal plate 49 as lights L15a and L15b.

The lights L15a and L15b are incident on the region of the magnetic domain A of the Faraday rotator 20. As shown on the left of FIG. 11(c), the lights L15a and L15b emerge from the Faraday rotator 20 as lights L16a and L16b whose polarization orientations are rotated clockwise around the Z axis by 45° when viewed in the +Z direction. The light L16a is incident on the half-wave plate 36, and the light L16b is incident on the half-wave plate 37. As shown on the left of FIG. 11(b), the light L16a emerges from the half-wave plate 36 as a light L17a whose polarization orientation is rotated counterclockwise around the Z axis by 45° when viewed in the +Z direction. The light L16b emerges from the half-wave plate 37 as a light L17b whose polarization orientation is rotated clockwise around the Z axis by 45° when viewed in the +Z direction. The light L17a is incident on the birefringent plate 16 as the extraordinary light, and the light L17b is incident on the birefringent plate 16 as the ordinary light. As shown in the left of FIG. 11(a), the light L17a is axially shifted in a direction opposite to an arrow C1, is combined with the light L17b, and emerges from the birefringent plate 16 as a light L18. The light L18 is incident on the light exit port P2 and emerges to the outside. Accordingly, all the light incident on the light incident port P1 in the first state emerges from the light exit port 2 independently of the polarization. Incidentally, although an illustration is omitted, light incident on the light exit port P2 in the first state does not emerge from the light incident port P1.

Next, the state of light incident from the light incident port P1 in a state (second state) in which the magnetic domain A is formed in the region of the Faraday rotator 20 on the −X side and the magnetic domain B is formed in the region on the +X side will be described with reference to FIG. 12. In the second state, differently from the first state, lights L25a and L25b shown on the left of FIG. 12(d) are incident on the region of the magnetic domain B of the Faraday rotator 20. As shown on the left of FIG. 12(c), polarization orientations of lights L26a and L26b emerging from the Faraday rotator 20 become perpendicular to the polarization orientations of the lights L16a and L16b shown on the left of FIG. 11(c). By this, as shown on the left of FIG. 12(a), a light L28a and a light L28b are not combined, and neither is incident on the light exit port P2. Accordingly, the light incident on the light incident port P1 in the second state does not emerge from the light exit port P2 independently of the polarization. Incidentally, although an illustration will be omitted, light incident on the light exit port P2 in the second state does not emerge from the light incident port P1.

Next, the state of light incident from the light incident port P1 in a state (third state) in which the magnetic domain B is formed in almost the whole of the Faraday rotator 20 will be described with reference to FIG. 13. In the third state, differently from the first and the second states, lights L33a and L33b shown on the right of FIG. 13(c) are incident on the region of the magnetic domain B of the Faraday rotator 20. As shown on the right of FIG. 13(d), polarization orientations of lights L34a and L34b emerging from the Faraday rotator 20 become parallel to a plane formed by intersection of a straight line parallel to the traveling directions of the lights L34a and L34b and a straight line parallel to the optical axis of the wedge birefringent crystal plate 49. The lights L34a and L34b are incident on the wedge birefringent crystal plate 49 as the extraordinary light, are reflected by the reflecting surface of the reflecting film 19 at an angle different from the case of the ordinary light, and emerge, as shown on the left of FIG. 13(d), from the wedge birefringent crystal plate 49 as lights L35a and L35b. The lights L35a and L35b travel on optical paths different from the lights L15a (L25a) and L15b (L25b). By this, as shown on the left of FIG. 13(a), although lights L37a and light L37b are combined, a combined light L38 is not incident on the light exit port P2. Accordingly, the light incident on the light incident port P1 in the third state does not emerge from the light exit port P2 independently of the polarization.

As stated above, according to the variable light attenuator 4 of this embodiment, the magnetic domain wall I is moved by controlling the current supplied to the coil 46b of the electromagnet 46, and the magnetic domain structure of the Faraday rotator 20 is gradually changed among the first state, the second state and the third state, so that the amount of attenuation of light incident on the light incident port P1 can be continuously changed. Besides, since the light incident on the light exit port P2 does not emerge from the light incident port P1 in the first and the second states, the variable light attenuator 4 comprises also a function as a light isolator. Further, since a very high amount of attenuation can be obtained in the third state, the variable light attenuator 4 comprises also a function as a light shutter.

Fourth Embodiment

Next, a magneto-optical component according to a fourth embodiment of the invention will be described with reference to FIGS. 14 to 16D. In general, in a magneto-optical component comprising a variable optical characteristic, a variable magnetic field is applied to a Faraday rotator by controlling a current supplied to a coil of an electromagnet. Thus, there arises a problem that electric power consumption of the magneto-optical component becomes large. In order to solve this problem, in this embodiment, a variable light attenuator of a magnetic domain wall moving system in which a magnetic domain wall I is formed in a Faraday rotator and an optical characteristic is made variable by applying a variable magnetic field to move the magnetic domain wall I, is characterized in that a beam diameter of a light beam transmitted through the Faraday rotator is made small.

Figure 14:
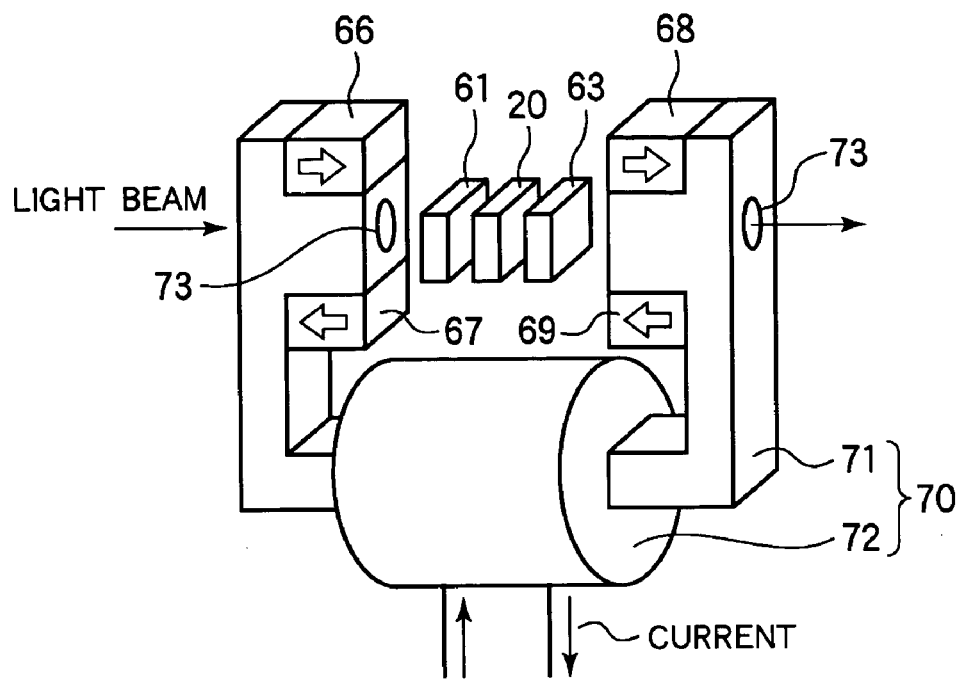
FIG. 14 is a view showing a structure of a variable light attenuator in which a relation between current and amount of attenuation is measured at different beam diameters.

A description will be given to the relation between the amount of attenuation in a variable light attenuator and a current flowing through a coil when the beam diameter of a light beam is varied. FIG. 14 shows the variable light attenuator used for the measurement of the relation between the amount of attenuation and the current. As shown in FIG. 14, the variable light attenuator comprises optical elements in which a polarizer 61, a Faraday rotator 20 and a polarizer 63 are disposed in this order.

Besides, the variable light attenuator comprises permanent magnets 66, 67, 68 and 69 for applying a saturation magnetic field to the Faraday rotator 20 in a direction parallel to an optical axis, and an electromagnet 70 for applying a variable magnetic field to the Faraday rotator 20 in the direction parallel to the optical axis. The electromagnet 70 comprises a C-shaped yoke 71 and a coil 72 wound around the yoke 71. The permanent magnet 66 is embedded in an upper part of one end (left in the drawing) of the yoke 71 in the drawing and the permanent magnet 67 is embedded in a lower part thereof in the drawing. The permanent magnet 68 is embedded in an upper part of the other end (right in the drawing) of the yoke 71 in the drawing, and the permanent magnet 69 is embedded in a lower part thereof in the drawing. The magnetic pole of each of the permanent magnets 66 and 68 is directed to the right in the drawing, and the magnetic pole of each of the permanent magnets 67 and 69 is directed to the left in the drawing.

A light introduction window 73 through which light is transmitted is provided in each of both ends of the yoke 71 of the electromagnet 70. The polarizer 61, the Faraday rotator 20 and the polarizer 63 are positioned between both the ends of the yoke 71. Light incident from the light introduction window 73 in the one end of the yoke 71 passes through the optical axes of the respective optical elements, and emerges from the light introduction window 73 in the other end of the yoke 71. When electric power is applied to the coil 72 of the electromagnet 70, a closed magnetic circuit passing through the yoke 71 and the optical elements between both the ends of the yoke 71 is formed, and a desired magnetic field parallel to the optical axis can be applied to the Faraday rotator 20 to which the saturation magnetic field is previously applied in parallel to the optical axis. By this, the magnetic domain wall I of the Faraday rotator 20 can be moved.

Figure 15:
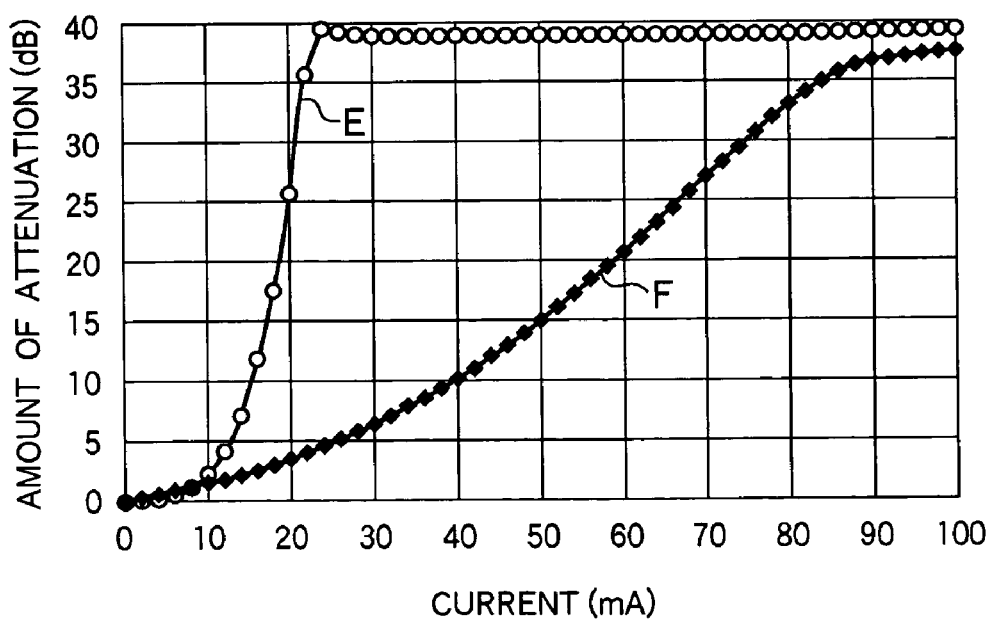
FIG. 15 is a graph showing the relation between the current and the amount of attenuation at the different beam diameters.

FIG. 15 is a graph showing the relation between the current and the amount of attenuation at different beam diameters. The horizontal axis indicates the current (mA) flowing through the coil 72, and the vertical axis indicates the amount of attenuation (dB) of light having been transmitted through the variable light attenuator. A line E indicates the relation between the current and the amount of attenuation in the case where the beam diameter is 62 µm, and a line F indicates the relation between the current and the amount of attenuation in the case where the beam diameter is 340 µm. As indicated by the line F of FIG. 15, in the case where the beam diameter is 340 µm, the current at the amount of attenuation of 30 dB is 75 mA, and the electric power consumption is 118 mW. On the other hand, as indicated by the line E, in the case where the beam diameter is 62 µm, the current at the amount of attenuation of 30 dB is 21 mA, and the electric power consumption is 9 mW. When the beam diameter of the light beam is made small (for example, 100 µm or less), the movement amount of the magnetic domain wall I can be made small, and therefore, the electric power consumption of the variable light attenuator can be greatly reduced.

FIGS. 16A to 16D show structural examples of a light waveguide provided with a micro-collimeter which is effective in decreasing the beam diameter of the light beam and can be miniaturized. As shown in FIG. 16A, a gradient index lens (GI lens) 50 comprising a cylindrical shape coaxial with an optical fiber 40 is fused and is directly fixed to the tip of a single mode optical fiber 40 comprising a core 40a. The GI lens 50 comprises a diameter within a range of from a value equal to the diameter (for example, 125 µm) of the single mode optical fiber 40 to a value approximately four times larger than that. The optical fiber 40 and the GI lens 50 are mutually united, and function as an optical fiber with a lens. The GI lens 50 comprises an end face 50a perpendicular to its cylindrical axis. The light incident on the GI lens 50 from the optical fiber 40 is converted into parallel light or convergent light, and emerges from the end face 50a in the direction perpendicular to the end face 50a (direction parallel to the optical fiber 40 and the cylindrical axis of the GI lens 50). The outer diameter of the GI lens 50 can be made small as compared with a spherical lens.

FIG. 16B shows a modified example of the structure of the optical waveguide comprising the micro-collimator. As shown in FIG. 16B, an end face 50a' of a GI lens 50' is polished obliquely to the cylindrical axis. In this structure, light incident on the GI lens 50' from the optical fiber 40 is converted into parallel light, and emerges from the end face 50a' in a direction oblique to the optical fiber 40 and the cylindrical axis of the GI lens 50'. Thus, in the case where light is made incident obliquely on a light incident/exit surface of an optical element, the GI lens 50' is more suitable than the GI lens 50. That is, when the GI lens 50' is used, even if the optical fiber 40 is disposed vertically to the light incident/exit surface of the optical element, the light can be made to emerge from the end face 50a' in a desired oblique direction.

FIG. 16C shows another modified example of the optical waveguide comprising the micro-collimator. As shown in FIG. 16C, an optical fiber with a lens in which instead of the GI lens 50, a small spherical lens 59 is fixed to an optical fiber 40 is also suitable in this embodiment.

FIG. 16D shows a still another modified example of the structure of the optical waveguide comprising the micro-collimator. As shown in FIG. 16D, a core expansion (TEC; Thermal Expand Core) fiber 40' comprising in the vicinity of a tip a core expansion region 40b in which a core 40a is expanded and which comprises a same function as a lens can also be used.

FIG. 17 schematically shows a structure of a magneto-optical component comprising an optical waveguide of a modified example other than the above. As shown in FIG. 17, an optical waveguide substrate 80 comprises a groove part 84 formed at the center part in the drawing, and an optical waveguide (SSC: Spot Size Converter) 82 provided with a pair of spot size expansion part 82a opposite to each other through the groove part 84 and for expanding a spot size of light to be guided. Optical elements, such as a polarizer 61, a Faraday rotator 20, and a polarizer 63, disposed between the spot size expansion parts 82a are embedded in the groove part 84. Here, the spot size expansion part 82a in FIG. 17 do not express a physical core, but expresses a spot size (electromagnetic field distribution) of light. There is a case where the width of the physical core of the spot size expansion part 82a is thicker than the width of the core in another region, and there is also a case where it is thinner. Besides, in FIG. 17, an illustration of a magnetic field application system is omitted. As stated above, the SSC can also be used as the optical waveguide.

According to the variable light attenuator of this embodiment, similarly to the first embodiment, since the system is such that the magnetic domain structure in the light transmission region is changed, the small and high-speed magneto-optical component can be realized.

Besides, according to this embodiment, since the movement amount of the magnetic domain wall can be decreased by decreasing the beam diameter of a light beam, the magneto-optical component with low power consumption can be obtained. Incidentally, in the conventional magneto-optical component of the magnetization rotation system, since the magnetization of a Faraday rotator is uniformly rotated irrespective of the beam diameter of the light beam, even if the beam diameter is decreased, reduction in electric power consumption can not be realized.

Fifth Embodiment

Figure 18:
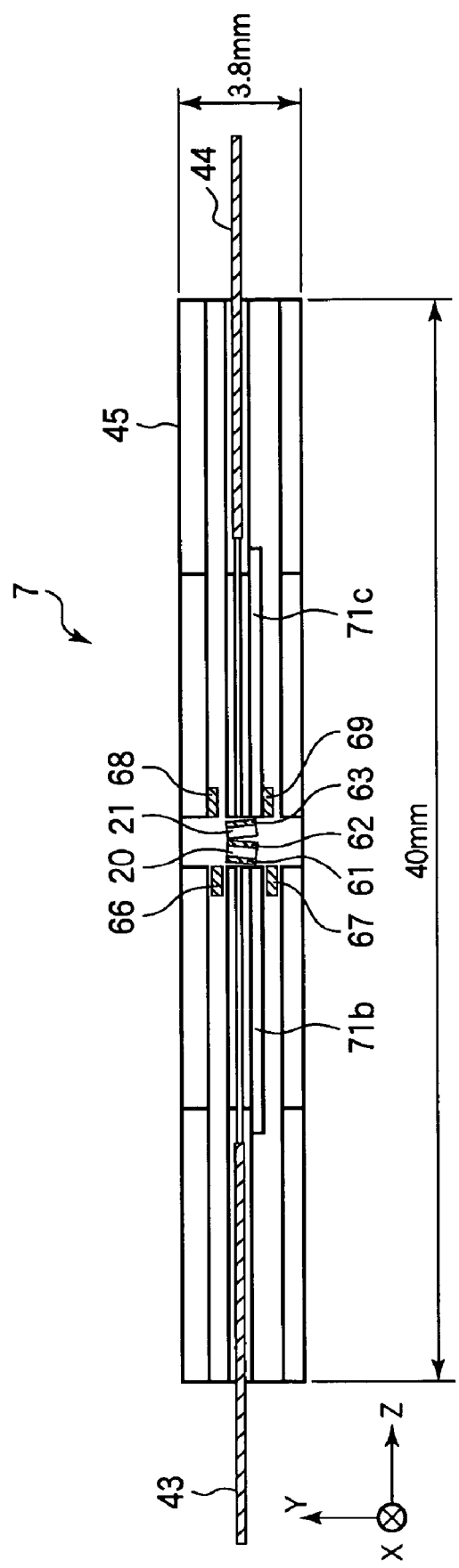
FIG. 18 is a view showing a structure of a transmission-type variable light attenuator as a magneto-optical component according to a fifth embodiment of the invention.
Figure 19:
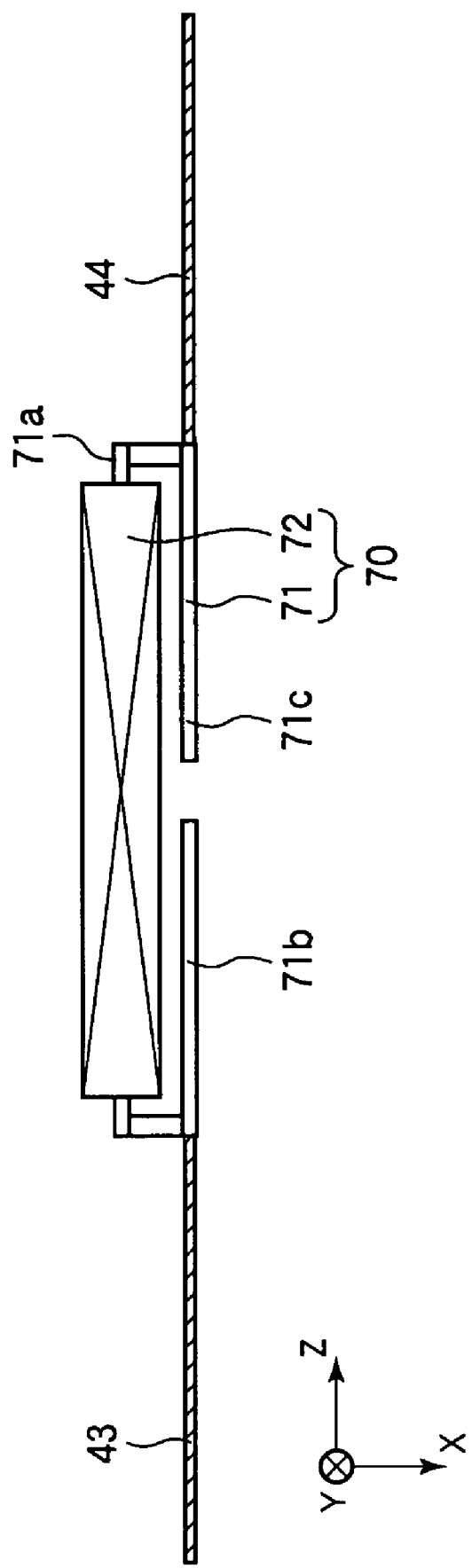
FIG. 19 is a view showing a structure of an electromagnet and an optical fiber of the magneto-optical component according to the fifth embodiment of the invention.

Next, a magneto-optical component according to a fifth embodiment of the invention will be described with reference to FIGS. 18 and 19. FIG. 18 shows a structure of a variable light attenuator 7 as the magneto-optical component according to this embodiment. FIG. 19 shows an electromagnet of the variable light attenuator 7 and an optical fiber. In FIGS. 18 and 19, the Z axis is taken in the traveling direction of light, and the X axis and the Y axis are taken in two directions orthogonal to each other on a plane orthogonal to the Z axis. As shown in FIGS. 18 and 19, the variable light attenuator 7 comprises optical elements in which a polarizer 61, a Faraday rotator 20, a polarizer 62, a Faraday rotator 21, and a polarizer 63 are disposed in this order, and are fixed on a glass substrate 45. In this example, the respective optical elements are disposed such that respective light incident/exit surfaces are oblique to the optical axis. The polarizer 61, the Faraday rotator 20, and the polarizer 62 are disposed such that the respective light incident/exit surfaces are parallel to each other. The Faraday rotator 21 and the polarizer 63 are disposed such that the respective light incident/exit surfaces are parallel to each other, and are non-parallel to the light incident/exit surfaces of the polarizer 61, the Faraday rotator 20 and the polarizer 62. The respective optical elements are disposed between both ends of an input optical fiber 43 comprising a micro-collimator at its tip and an output optical fiber 44 (optical waveguide). Incidentally, the structure of the optical elements is an example, and in addition to the above, various structures can be applied.

Besides, the variable light attenuator 7 comprises cuboid permanent magnets 66, 67, 68 and 69 for applying a saturation magnetic field to the Faraday rotators 20 and 21 in a direction parallel to the optical axis, and an electromagnet 70 (only ends 71b and 71c of a yoke 71 are shown in FIG. 18) for applying a variable magnetic field to the Faraday rotators 20 and 21 in the direction parallel to the optical axis. The direction (magnetization direction) of the magnetic pole of each of the permanent magnets 66 and 69 is directed to, for example, the right in the drawing, and the direction of the magnetic pole of each of the permanent magnets 67 and 68 is directed to the left in the drawing. The permanent magnet 66 is closer to the optical axis than the permanent magnet 68, and the permanent magnet 69 is closer to the optical axis than the permanent magnet 67. The positions of the magnetic domain walls I of the two Faraday rotators 20 and 21 can be adjusted by adjusting the positions of the permanent magnets 66, 67, 68 and 69. The electromagnet 70 comprises a C-shaped yoke 71 and a coil 72 wound around the yoke 71. The yoke 71 comprises a center part 71a around which the coil 72 is wound and both ends 71b and 71c opposite to each other through the optical element. The one end 71b of the yoke 71 extends along the input optical fiber 43 almost in parallel thereto, and the other end 71c extends along the output optical fiber 44 almost in parallel thereto. Besides, the center part 71a of the yoke 71 and the coil 72 also extend along the input optical fiber 43 and the output optical fiber 44 almost in parallel thereto. A closed magnetic circuit passing through the yoke 71 and the optical element between both the ends 71b and 71c of the yoke 71 is formed by applying electric power to the coil 72 of the electromagnet 70, and a desired magnetic field parallel to the optical axis can be applied to the Faraday rotators 20 and 21 to which the saturation magnetic field is previously applied in parallel to the optical axis. By this, the magnetic domain walls I of the Faraday rotators 20 and 21 can be moved.

According to the variable light attenuator 7 of this embodiment, similarly to the first embodiment, since the system is such that the magnetic domain structure in the light transmission region is changed, the small and high-speed magneto-optical component can be realized.

Besides, the variable light attenuator 7 according to this embodiment comprises the yoke 71 and the coil 72 extending along the input optical fiber 43 and the output optical fiber 44. In the case of the optical component with the optical fiber as in this embodiment, since a space for the input optical fiber 43 and the output optical fiber 44 is certainly required, it is very effective in miniaturizing the whole optical component to dispose the yoke 71 and the coil 72 along the input optical fiber 43 and the output optical fiber 44. In this embodiment, the length of the variable light attenuator 7 in the Z direction is 40 mm, and the width in the Y direction is 3.8 mm. Besides, this embodiment is suitable for formation of an array in which a plurality of variable light attenuators 7 are arranged, for example, in the Y direction.

Sixth Embodiment

Figure 20:
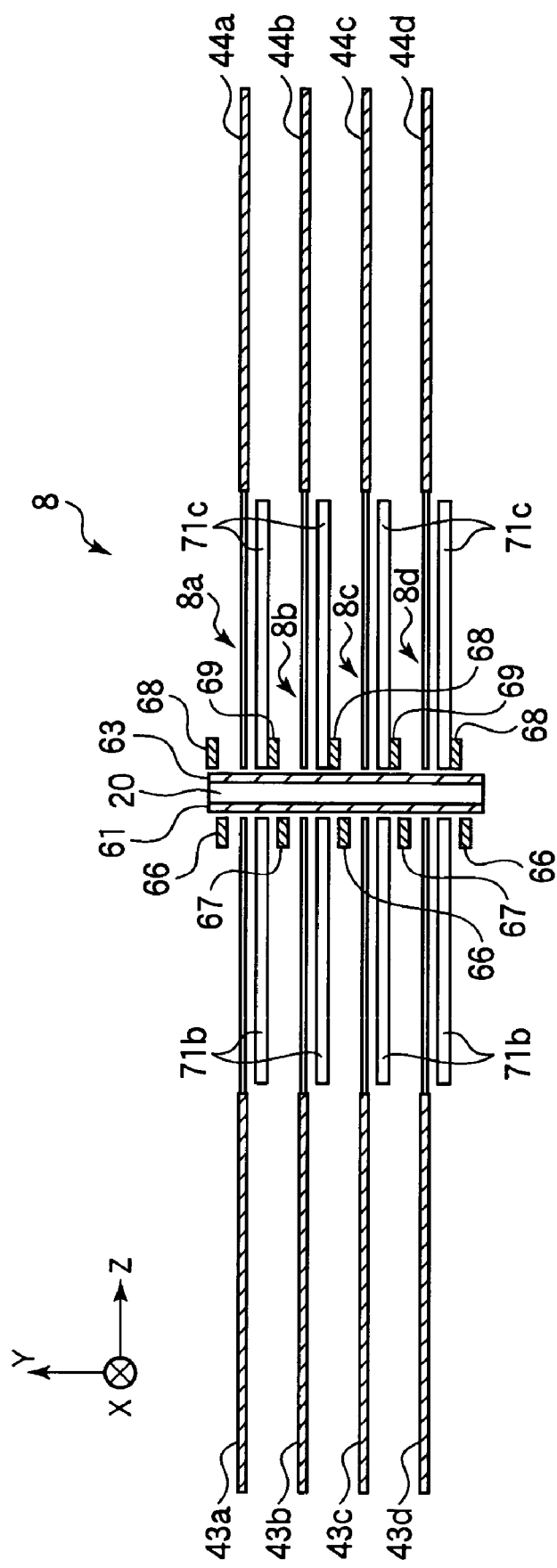
FIG. 20 is a view showing a structure of an arrayed variable light attenuator as a magneto-optical component according to a sixth embodiment of the invention.

Next, a magneto-optical component according to a sixth embodiment will be described with reference to FIGS. 20 and 21. FIG. 20 schematically shows a structure of an arrayed variable light attenuator 8 as the magneto-optical component according to this embodiment. The Z axis is taken in the traveling direction of light, and the X axis and the Y axis are taken in two directions orthogonal to each other on a plane orthogonal to the Z axis. As shown in FIG. 20, the variable light attenuator 8 comprises such a structure that four variable light attenuators 8a to 8d each comprising a magnetic field application system similar to the variable light attenuator 7 according to the fifth embodiment are arrayed. Four pairs of input optical fibers 43a to 43d and output optical fibers 44a to 44d (optical fiber pair (43a, 44a) to (43d, 44d)) disposed side by side in the Y direction are connected to the variable light attenuator 8. The variable light attenuator 8 comprises optical elements in which one polarizer 61, one Faraday rotator 20 and one polarizer 62 are disposed in this order between ends of the input optical fibers 43a to 43d and ends of the output optical fibers 44a to 44d. The respective optical elements are shared by the four variable light attenuators 8a to 8d. Incidentally, the structure of the optical element is one example, and various structures other than the above can be applied.

Figure 21:
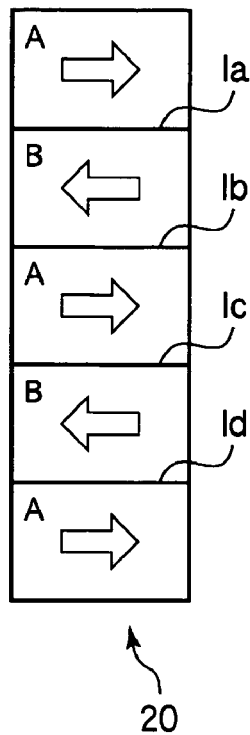
FIG. 21 is a view showing a magnetic domain structure of a Faraday rotator.
Figure 22A:
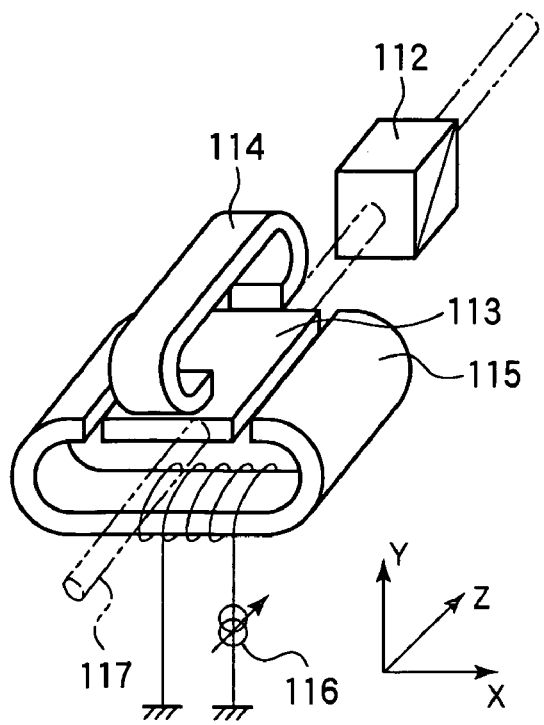
FIGS. 22A and 22B are views for explaining a rough structure of a variable light attenuator as a conventional magneto-optical component and its operation principle.
Figure 22B:
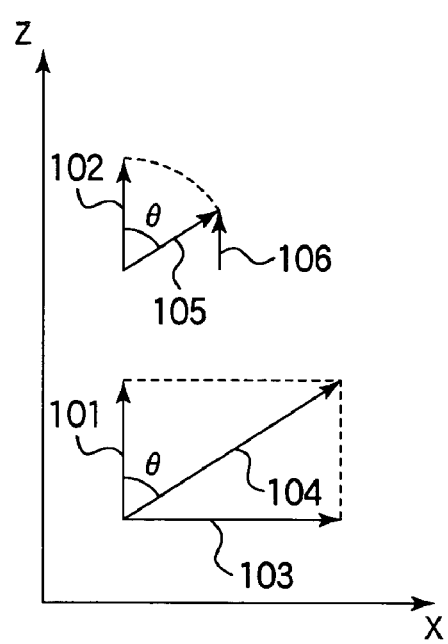

FIG. 21 shows a magnetic domain structure of the Faraday rotator 20. As shown in FIG. 21, a magnetic field of a specified distribution is applied to the Faraday rotator 20 by a plurality of permanent magnets 66, 67, 68 and 69 comprising magnetic poles of specified directions and an electromagnet 70 (not shown). By this, a multi-magnetic domain structure (in FIG. 21, the direction of magnetization is indicated by a thick arrow) in which a plurality of magnetic domains A, magnetic domains B and magnetic domain walls I (Ia to Id) are formed is formed in the Faraday rotator 20. Here, the magnetic domain walls Ia to Id are formed to correspond to the four variable light attenuators 8a to 8d. The respective magnetic domain walls Ia to Id can be moved in ±Y direction by controlling current supplied to the coil 72 of the electromagnet 70 of the variable light attenuators 8a to 8d. The permanent magnets 66, 67, 68 and 69 are shared by the adjacent variable light attenuators 8a to 8d. For example, the permanent magnet 69 on the +Y side is shared by the variable light attenuators 8a and 8b.

According to the variable light attenuator 8 of this embodiment, similarly to the first embodiment, since the system is such that the magnetic domain structure in the light transmission region is changed, the small and high-speed magneto-optical component can be realized.

Besides, according to this embodiment, as compared with the structure in which a plurality of variable light attenuators are simply combined, since each optical element and permanent magnet can be shared by a plurality of variable light attenuators 8a to 8d, the number of parts is decreased, and the miniaturization and reduction in cost of the variable light attenuator can be realized.

The invention is not limited to the above embodiments, and can be variously modified.

For example, in the embodiment, although the permanent magnet is used as the magnetic field application system to apply the magnetic field in the direction perpendicular to the light incident/exit surface to the magneto-optical element, the invention is not limited to this. For example, instead of the permanent magnet, a semi-hard magnet which comprises lower coercive force than a permanent magnet and can invert magnetization may be naturally used.

Besides, although the variable light attenuator is exemplified in the embodiment, the invention is not limited to this, and can also be applied to another magneto-optical component such as a light modulator or a light switch.

What is claimed is:

1. A magneto-optical component comprising:
   at least one magneto-optical element comprising a magnetic domain A with magnetization in a direction not parallel to a light incident/exit surface, a magnetic domain B with magnetization in a direction opposite to the magnetization direction of the magnetic domain A, a planar magnetic domain wall as a boundary between the magnetic domain A and the magnetic domain B, and a plurality of light transmission regions through which a plurality of light beams comprising identical traveling directions are transmitted respectively; and
   a magnetic field application system for applying a variable magnetic field to the magneto-optical element to make a position of the magnetic domain wall variable.

2. A magneto-optical component according to claim 1, wherein distances between the magnetic domain wall and the plurality of light beams are almost equal to each other.

3. A magneto-optical component according to claim 2, further comprising at least two birefringent plates,
   wherein an axial shift direction of each of the birefringent plates is almost parallel to the magnetic domain wall, and
   the magneto-optical element is disposed between the first birefringent plate and the second birefringent plate.

4. A magneto-optical component according to claim 2, further comprising at least three birefringent plates,
   wherein the first magneto-optical element is disposed between the first birefringent plate and the second birefringent plate,
   the second magneto-optical element is disposed between the second birefringent plate and the third birefringent plate,
   magnetic domain walls of the first and the second magneto-optical elements are almost parallel to each other, and
   an axial shift direction of each of the first to the third birefringent plates is almost parallel to the magnetic domain walls of the first and the second magneto-optical elements.

5. A magneto-optical component according to claim 4, wherein a sum of an axial shift amount of the first birefringent plate and an axial shift amount of the third birefringent plate is almost equal to an axial shift amount of the second birefringent plate.

6. A magneto-optical component comprising:
   at least one magneto-optical element comprising a magnetic domain A with magnetization in a direction not parallel to a light incident/exit surface, a magnetic domain B with magnetization in a direction opposite to the magnetization direction of the magnetic domain A, a planar magnetic domain wall as a boundary between the magnetic domain A and the magnetic domain B, a plurality of first light transmission regions through which a plurality of first light beams traveling in a specified direction are transmitted respectively, and a plurality of second light transmission regions through which a plurality of second light beams traveling in a direction substantially opposite to the specified direction are transmitted respectively;
   a reflecting part for reflecting the plurality of first light beams as the plurality of second light beams; and
   a magnetic field application system for applying a variable magnetic field to the magneto-optical element to make a position of the magnetic domain wall variable.

7. A magneto-optical component according to claim 6, wherein
   distances between the magnetic domain wall and the plurality of first light beams are almost equal to each other, and
   distances between the magnetic domain wall and the plurality of second light beams are almost equal to each other.

8. A magneto-optical component according to claim 6, further comprising:
   a first birefringent plate for separating light incident from outside into polarization components orthogonal to each other and sending them as the plurality of first light beams;
   at least one half-wave plate for causing polarization orientations of the plurality of first light beams to be coincident with each other and causing them to be incident on the magneto-optical element; and
   a second birefringent plate for combining the plurality of second light beams having been transmitted through the magneto-optical element and sending them to the outside.

9. A magneto-optical component comprising:
   at least two optical waveguides;
   at least one magneto-optical element comprising a magnetic domain A with magnetization in a direction not parallel to a light incident/exit surface on which light from the optical waveguide is incident or from which light to the optical waveguide is exited, a magnetic domain B with magnetization in a direction opposite to the magnetization direction of the magnetic domain A, and a planar magnetic domain wall as a boundary between the magnetic domain A and the magnetic domain B; and
   a magnetic field application system for applying a variable magnetic field to the magneto-optical element to make a position of the magnetic domain wall variable.

10. A magneto-optical component according to claim 9, wherein the optical waveguide comprises an optical fiber, and a lens directly fixed to a tip of the optical fiber.

11. A magneto-optical component according to claim 9, wherein the optical waveguide comprises an optical fiber comprising a core expansion region in a vicinity of its tip.

12. A magneto-optical component comprising:
   at least two optical waveguides;
   at least one magneto-optical element comprising a magnetic domain A with magnetization in a direction not parallel to a light incident/exit surface on which light from the optical waveguide is incident or from which light to the optical waveguide is exited, a magnetic domain B with magnetization in a direction opposite to the magnetization direction of the magnetic domain A, and a planar magnetic domain wall as a boundary between the magnetic domain A and the magnetic domain B; and
   a magnetic field application system comprising an electromagnet comprising a yoke extending along the optical waveguides and a coil wound around the yoke and for applying a variable magnetic field to the magneto-optical element to make a position of the magnetic domain wall variable.

13. A magneto-optical component comprising:
   a plurality of optical waveguide pairs each comprising at least two optical waveguides,
   at least one magneto-optical element comprising a magnetic domain A with magnetization in a direction not parallel to a light incident/exit surface on which light from the optical waveguide is incident or from which light to the optical waveguide is exited, a magnetic domain B with magnetization in a direction opposite to the magnetization direction of the magnetic domain A, and a planar magnetic domain wall formed to correspond to the optical waveguide pair and to become a boundary between the magnetic domain A and the magnetic domain B; and
   a magnetic field application system comprising an electromagnet comprising a yoke extending along the optical waveguides and a coil wound around the yoke and for applying a variable magnetic field to the magneto-optical element to make a position of the magnetic domain wall variable.

* * * * *